US011777822B2

(12) United States Patent
Srinivasan et al.

(10) Patent No.: US 11,777,822 B2
(45) Date of Patent: Oct. 3, 2023

(54) PERFORMANCE PROFILE FOR NETWORK STACK COMPONENTS

(71) Applicant: Microsoft Technology Licensing, LLC, Redmond, WA (US)

(72) Inventors: Harish Srinivasan, Sammamish, WA (US); Khoa Anh To, Redmond, WA (US); Daniel Frederick Cuomo, Jr., Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/457,856

(22) Filed: Dec. 6, 2021

(65) Prior Publication Data
US 2023/0179497 A1 Jun. 8, 2023

(51) Int. Cl.
G06F 15/16 (2006.01)
H04L 43/08 (2022.01)
H04L 41/50 (2022.01)
H04L 41/22 (2022.01)

(52) U.S. Cl.
CPC ............. H04L 43/08 (2013.01); H04L 41/22 (2013.01); H04L 41/5032 (2013.01)

(58) Field of Classification Search
CPC ...... H04L 43/08; H04L 41/22; H04L 41/5032
See application file for complete search history.

(56) References Cited

U.S. PATENT DOCUMENTS

| 2007/0189227 | A1* | 8/2007 | Lotter ................. | H04W 28/18 370/332 |
| 2007/0226375 | A1 | 9/2007 | Chu et al. | |
| 2014/0194068 | A1* | 7/2014 | Coppage ............. | H04W 28/18 455/67.11 |
| 2019/0182114 | A1 | 6/2019 | Tavridis et al. | |
| 2019/0303002 | A1* | 10/2019 | Frolikov ............... | G06F 3/0605 |
| 2020/0120519 | A1 | 4/2020 | Horton et al. | |
| 2020/0322242 | A1 | 10/2020 | Malysh et al. | |

OTHER PUBLICATIONS

"International Search Report and Written Opinion Issued in PCT Application No. PCT/US22/043728", dated Dec. 5, 2022, 13 Pages.

* cited by examiner

*Primary Examiner* — Padma Mundur
(74) *Attorney, Agent, or Firm* — Newport IP, LLC; Jacob P. Rohwer

(57) ABSTRACT

A computing device is provided, including a processor configured to receive a selection of a performance profile of a plurality of performance profiles. The performance profile may indicate a performance variable goal state for a first network stack component included in a network stack of a plurality of network stack components. In response to receiving the selection of the performance profile, the processor may be further configured to control a network performance parameter of the first network stack component such that a performance variable of the first network stack component approaches the performance variable goal state. The processor may be further configured to transmit, to an additional network stack component of the plurality of network stack components, instructions to control an additional network performance parameter of the additional network stack component such that the performance variable of the first network stack component approaches the performance variable goal state.

20 Claims, 15 Drawing Sheets

300 ⟶

┌─────────────────────────────────────────────────────────────────┐
│ RECEIVING A SELECTION OF A PERFORMANCE PROFILE OF A PLURALITY OF │
│ PERFORMANCE PROFILES, WHEREIN THE PERFORMANCE PROFILE INDICATES A │ 302
│ PERFORMANCE VARIABLE GOAL STATE FOR A FIRST NETWORK STACK │
│ COMPONENT INCLUDED IN A NETWORK STACK OF A PLURALITY OF NETWORK │
│ STACK COMPONENTS │
└─────────────────────────────────────────────────────────────────┘
                                    ↓
┌─────────────────────────────────────────────────────────────────┐
│ IN RESPONSE TO RECEIVING THE SELECTION OF THE PERFORMANCE PROFILE, │
│ CONTROLLING A NETWORK PERFORMANCE PARAMETER OF THE FIRST │ 304
│ NETWORK STACK COMPONENT SUCH THAT A PERFORMANCE VARIABLE OF THE │
│ FIRST NETWORK STACK COMPONENT APPROACHES THE PERFORMANCE │
│ VARIABLE GOAL STATE │
└─────────────────────────────────────────────────────────────────┘
                                    ↓
┌─────────────────────────────────────────────────────────────────┐
│ TRANSMITTING, TO AN ADDITIONAL NETWORK STACK COMPONENT OF THE │
│ PLURALITY OF NETWORK STACK COMPONENTS, INSTRUCTIONS TO CONTROL AN │ 306
│ ADDITIONAL NETWORK PERFORMANCE PARAMETER OF THE ADDITIONAL │
│ NETWORK STACK COMPONENT SUCH THAT THE PERFORMANCE VARIABLE OF │
│ THE FIRST NETWORK STACK COMPONENT APPROACHES THE PERFORMANCE │
│ VARIABLE GOAL STATE │
└─────────────────────────────────────────────────────────────────┘

FIG. 9A

PERFORMANCE PROFILE FOR NETWORK STACK COMPONENTS

BACKGROUND

When computing devices communicate with each other over a network, data is transmitted between the computing devices through a network stack that includes multiple layers. For example, when computing devices communicate via Transmission Control Protocol/Internet Protocol (TCP/IP), data is transmitted through an application layer, a transport layer, an Internet layer, and a link layer. At each of these layers, computing processes that manage transmission of data between layers are performed. These computing processes may be components of the network stack that have their own configuration settings.

SUMMARY

According to one aspect of the present disclosure, a computing device is provided, including a processor configured to receive a selection of a performance profile of a plurality of performance profiles. The performance profile may indicate a performance variable goal state for a first network stack component included in a network stack of a plurality of network stack components. In response to receiving the selection of the performance profile, the processor may be further configured to control a network performance parameter of the first network stack component such that a performance variable of the first network stack component approaches the performance variable goal state. The processor may be further configured to transmit, to an additional network stack component of the plurality of network stack components, instructions to control an additional network performance parameter of the additional network stack component such that the performance variable of the first network stack component approaches the performance variable goal state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9A shows a flowchart of a method for use at a computing device when a first network stack component is executed, according to the example of FIG. 1.

DETAILED DESCRIPTION

When a computing device is used in different settings and to execute different applications, different network settings may be conducive to achieving desired performance characteristics for the computing device. For example, high throughput may be more desirable than low latency when the computing device is a host server device that is used when providing cloud computing services. In contrast, low latency may be more desirable than high throughput when the computing device is a client device that is executing a web browser application program.

The settings of the network stack components included in the network stack may affect the performance of the application program executed at the computing device. Depending upon the network performance characteristics that the user desires for the computing device, different combinations of settings at the network stack components may be preferable. However, users typically do not have high levels of expertise in the area of computer networking. Thus, a user may not know what combinations of network stack component settings would allow high performance to be achieved for specific applications or computing tasks. In addition, the user typically does not have access to the settings of network stack components that are executed on other computing devices, and accordingly is unable to modify the settings of such network stack components to improve the performance of the application.

Figure 1:
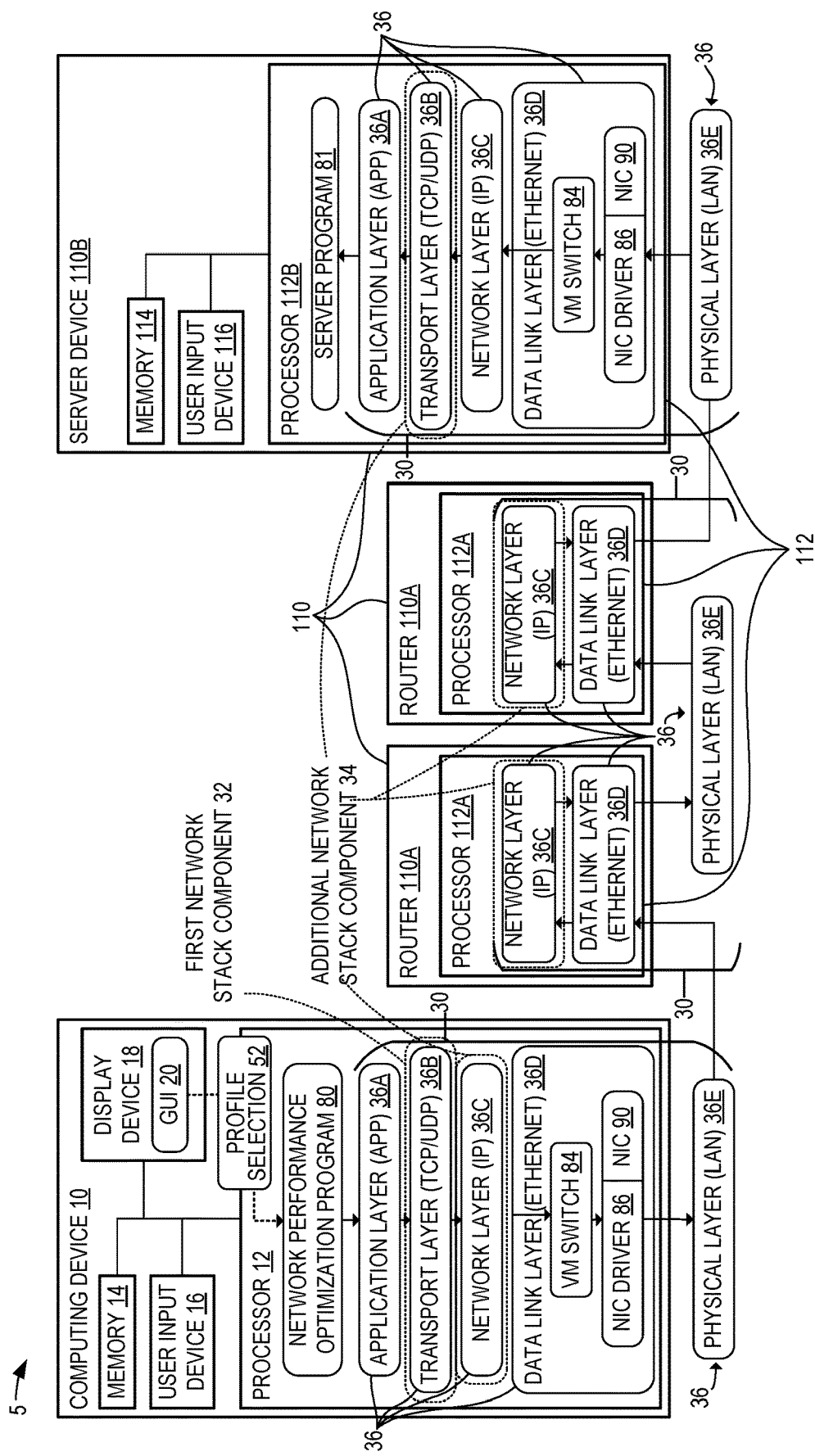
FIG. 1 schematically depicts a network stack including a plurality of network stack components executed at a plurality of computing devices, according to one example embodiment.

In order to address the above challenges, a computing system 5 including a computing device 10 is provided, as depicted schematically in FIG. 1 according to one example embodiment. The computing device 10 may, for example, be configured to send data to, and receive data from, one or more additional computing devices 110 of the computing system 5. The computing device 10 may be a client computing device that is configured to communicate with one or more server computing devices 110B over a network. In other examples, the computing device 10 itself is configured as a server computing device. In the example of FIG. 1, the computing device 10 is a client computing device, and the one or more additional computing devices 110 include a plurality of routers 110A and a server computing device 110B.

In embodiments, the computing device 10 includes a processor 12, which may include one or more physical processing devices. For example, the processor 12 may be instantiated as one or more central processing unit (CPU) cores, one or more graphical processing units (GPUs), one or more hardware accelerators specialized for particular computational tasks, specially configured hardware such as field programmable gate arrays (FPGAs) or application specific integrated circuits (ASICs) and/or one or more other types of processing devices. In embodiments, the processor 12 is operatively coupled to memory 14 over a data bus. The memory 14 may, for example, include volatile memory and/or non-volatile storage.

In embodiments, the processor 12 is further coupled over the data bus to one or more user input devices 16 via which the processor 12 is configured to receive inputs from a user. In addition, the processor 12 may be coupled via the data bus to a display 18 configured to display a graphical user interface (GUI) 20 to the user. At the GUI 20, the user may interact with one or more user interface elements via the one or more user input devices 16, as discussed in further detail below. The computing device 10 may further include one or more other types of output devices in addition to the display 18 in some examples. In some examples, a user input device 16 and the display 18 may be integrated into a single component such as a touchscreen.

The processor 12 of the computing device 10 may be configured to execute a first network stack component 32 included in a network stack 30 of a plurality of network stack components. The network stack 30 may include the first network stack component 32 along with one or more additional network stack components 34. Examples of the components in the network stack 30 are described in more detail below. The first network stack components 32 and the additional network stack components 34 are computing processes that are executed when the respective computing devices at which they are executed network with other computing devices. In FIG. 1, the particular components in network stack 30 that are labelled as first network stack component 32 and as additional network stack components 34 are merely exemplary as it will be understood that any of the components in network stack 30 may function as the first network stack component 32 and as the additional network stack component(s) 34. The network stack components included in the network stack 30 may be computing processes (e.g., instances of executed programs) that are configured to communicate with each other according to one or more networking protocols when the computing device 10 communicates with the one or more additional computing devices 110. The first network stack component 32 and the one or more additional network stack components 34 may, for example, communicate by transmitting network communications to each other according to the Transmission Control Protocol/Internet Protocol (TCP/IP) or Universal Datagram Protocol/Internet Protocol (UDP/IP) implementation of the Open Systems Interconnect (OSI) model.

The network stack components may be communicatively connected to each other in a network topology. In some examples, as shown in FIG. 1, the first network stack component 32 is a client-side network stack component and at least one of the additional network stack components 34 is a server-side network stack component. Although FIG. 1 shows the first network stack component 32 at an endpoint layer of the network stack 30, the first network stack component 32 is located at an intermediate layer of the network stack 30 in other embodiments. In examples in which the network stack 30 utilizes TCP/IP or UDP/IP, the first network stack component 32 and the one or more additional network stack components 34 may be computing processes that instantiate portions of respective network protocol layers.

Each additional network stack component 34 of the one or more additional network stack components 34 may be executed at the processor 12 of the computing device 10 or at an additional device processor 112 of an additional computing device 110. In the example of FIG. 1, a plurality of additional network stack components 34 are executed at respective additional device processors 112 of a plurality of additional computing devices 110. In addition, the example of FIG. 1 shows an additional network stack component 34 that is configured to be executed at the processor 12.

The network stack 30 may have a hierarchical structure in which the network stack components are arranged in a plurality of network stack layers 36. For example, when the network stack components are TCP/IP or UDP/IP processes, the network stack layers 36 may be TCP/IP or UDP/IP stack layers. During communication between the computing device 10 and the one or more additional computing devices 110, data may be transmitted between the network stack layers 36. In the example of FIG. 1, the network stack layers 36 include an application layer 36A, a transport layer 36B, a network layer 36C, a data link layer 36D, and a physical layer 36E. The application layer 36A, the transport layer 36B, the network layer 36C, and the data link layer 36D may each include or be implemented by respective programs that are executed at the processor 12, a processor 112A of a router 110A, or a processor 112B of the server device 110B. As shown in the example of FIG. 1, an application program may be executed at the application layer 36A, a TCP program or a UDP program may be executed at the transport layer 36B, an IP program may be executed at the network layer 36C (or alternatively a combined TCP/IP program or UDP/IP program may be executed to implement processing at both the transport layer 36B and network layer 36C), and a VM switch 84 and NIC driver 86 may be may be executed at the data link layer 36D. The physical layer 36E may, for example, be a local area network (LAN) or wide area network (WAN) layer.

In the example of FIG. 1, the computing device 10 is configured to receive data from and transmit data to the physical layer 36E via a network interface controller (NIC) 90. The NIC driver 86 is provided to configure and control the NIC 90. In addition, as shown in the example of FIG. 1, the processor 12 of the computing device 10 is further configured to execute the virtual machine (VM) switch 84, which is configured to transmit data at the data link layer between the NIC 90 and one or more VMs executed at the processor 12. Thus, the VM switch is configured to transmit packets received at the NIC 90 to respective destination VMs and vice versa. In other embodiments where VMs are not executed on the computing device 10, the VM switch is omitted and communications from the network layer 36C are forwarded directly to the NIC 90.

The processor 12 may be further configured to execute a network performance optimization program 80, as discussed in further detail below. In embodiments where the processor 12 executes the network performance optimization program 80, the processor 12 is configured to apply a performance profile to at least the first network stack component 32 to modify one or more performance parameters of the first network stack component 32. As discussed in further detail below with reference to FIGS. 3 and 4, the performance profile is a descriptor of networking-related performance goals for the first network stack component 32. The processor 12 may be further configured to transmit instructions to one or more additional network stack components 34 to modify one or more additional performance parameters. The network performance optimization program 80 may be interactable via the GUI 20 and may be configured to receive a profile selection 52 of a performance profile from the GUI 20, as discussed in further detail below with regard to FIG. 3.

Figure 2:
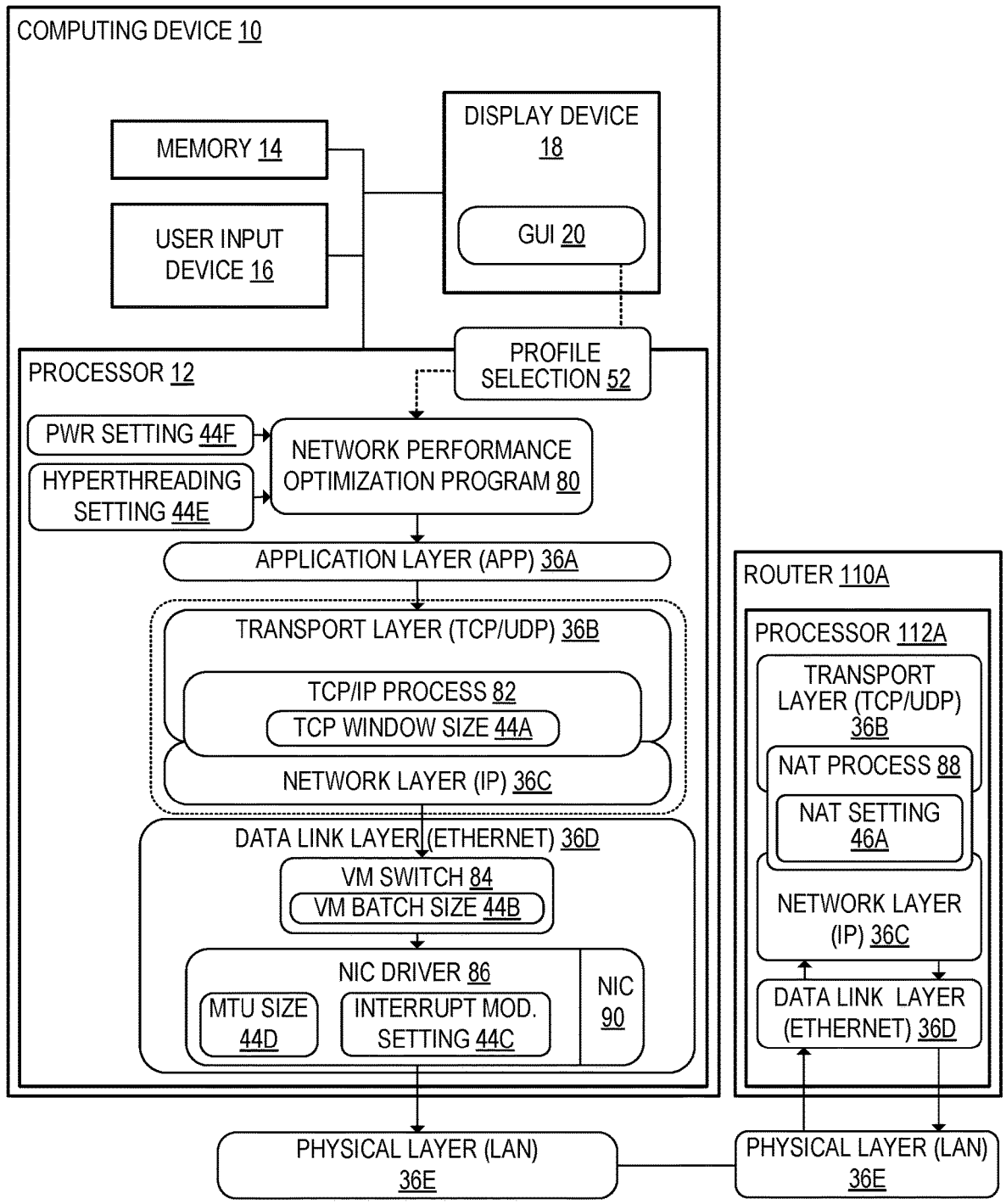
FIG. 2 schematically shows a computing device and a router in additional detail when the computing device and the router are configured to execute network stack components included in the network stack, according to the example of FIG. 1.

FIG. 2 shows the computing device 10 and router 110A in additional detail in an embodiment where the plurality of network stack components are executed at the processor 12 of the computing device 10 and the processor 112A of the router 110A. As shown in the example of FIG. 2, each network stack component of the plurality of network stack components included in the network stack 30 may be a TCP/IP process 82, a network address translation (NAT) process 88, a VM switch 84, or a NIC driver 86, or other suitable network stack component process. The TCP/IP process 82, the VM switch 82, and the NIC driver 86 may be executed at the processor 12. The NAT process 88 may be executed at the processor 112A of router 110A, at the transport layer 36B and the network layer 36C.

Figure 3:
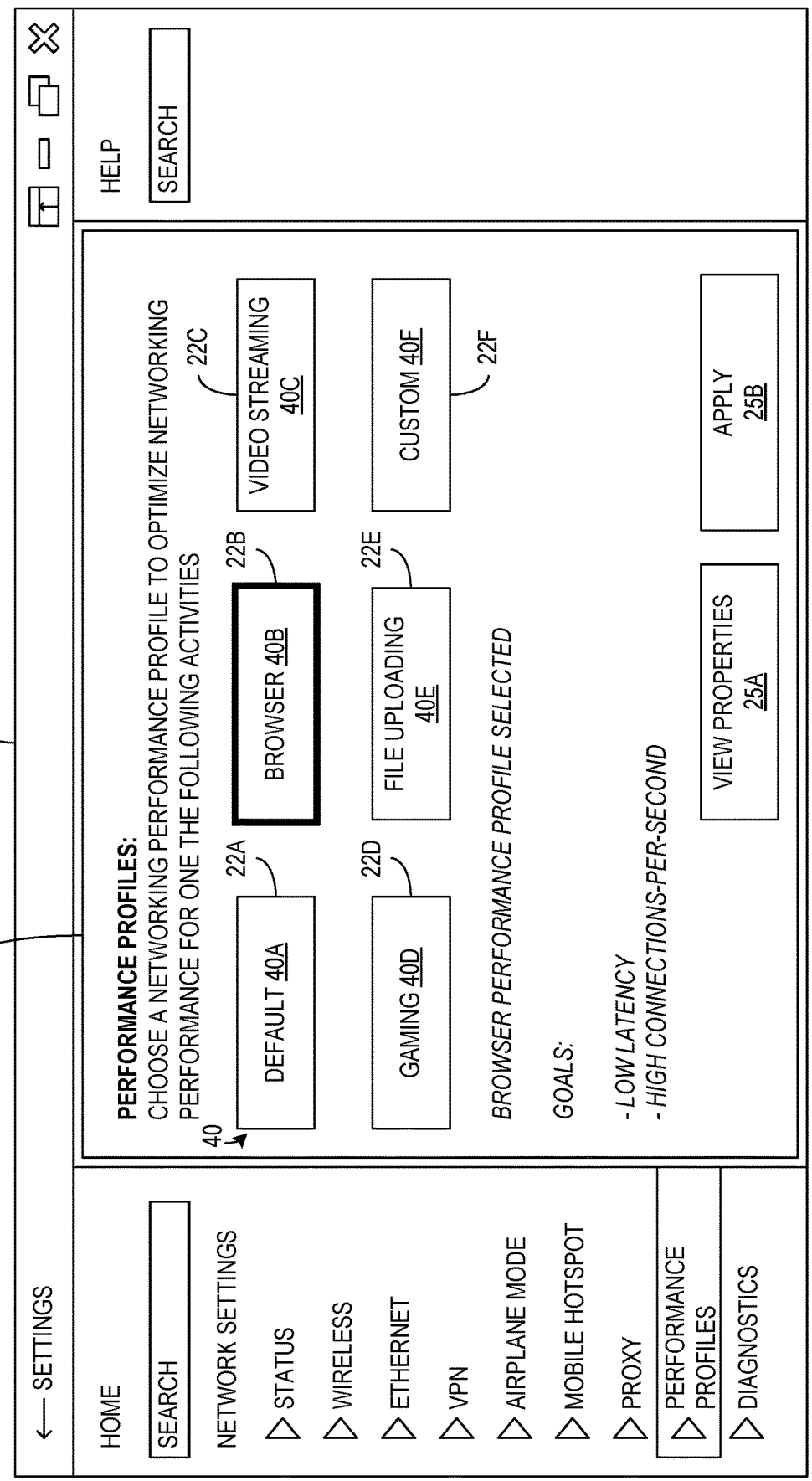
FIG. 3 shows an example graphical user interface (GUI) at which a user may select a performance profile for a first network stack component, according to the example of FIG. 1.

As discussed above, the processor 12 may be further configured to generate a GUI 20 and output (e.g., display) the GUI 20 at the display device 18. FIG. 3 shows an example GUI 20 that may be output at the display device 18 when the user specifies network settings for the first network stack component 32. As depicted in the example of FIG. 3, the GUI 20 may include a performance profile selection interface element 22 associated with the first network stack component 32. By interacting with the performance profile selection interface element 22, the user may select a performance profile 40 for the first network stack component 32. As discussed in further detail below with regard to FIG. 4, the performance profile may be utilized when setting one or more network performance parameters. At a plurality of profile selectors 22A, 22B, 22C, 22D, 22E, and 22F, the performance profile selection interface element 22 shown in the example of FIG. 3 indicates respective application program types with which the plurality of performance profiles are associated. The profile selector 22A indicates a default performance profile 40A, the profile selector 22B indicates a browser performance profile 40B, the profile selector 22C indicates a video performance profile 40C, the profile selector 22D indicates a gaming performance profile 40D, the profile selector 22E indicates a file upload performance profile 40E, and the profile selector 22F indicates a custom performance profile 40F. In the example of FIG. 3, the profile selector 22B for the browser performance profile is selected. Upon selection of the view properties selector 25A, the GUI 20 displays explanatory information informing the user of the manner in which networking settings will be adjusted to optimize for the selected performance profile. The selected performance profile may be applied via user selection of an apply selector 25B.

Figure 4:
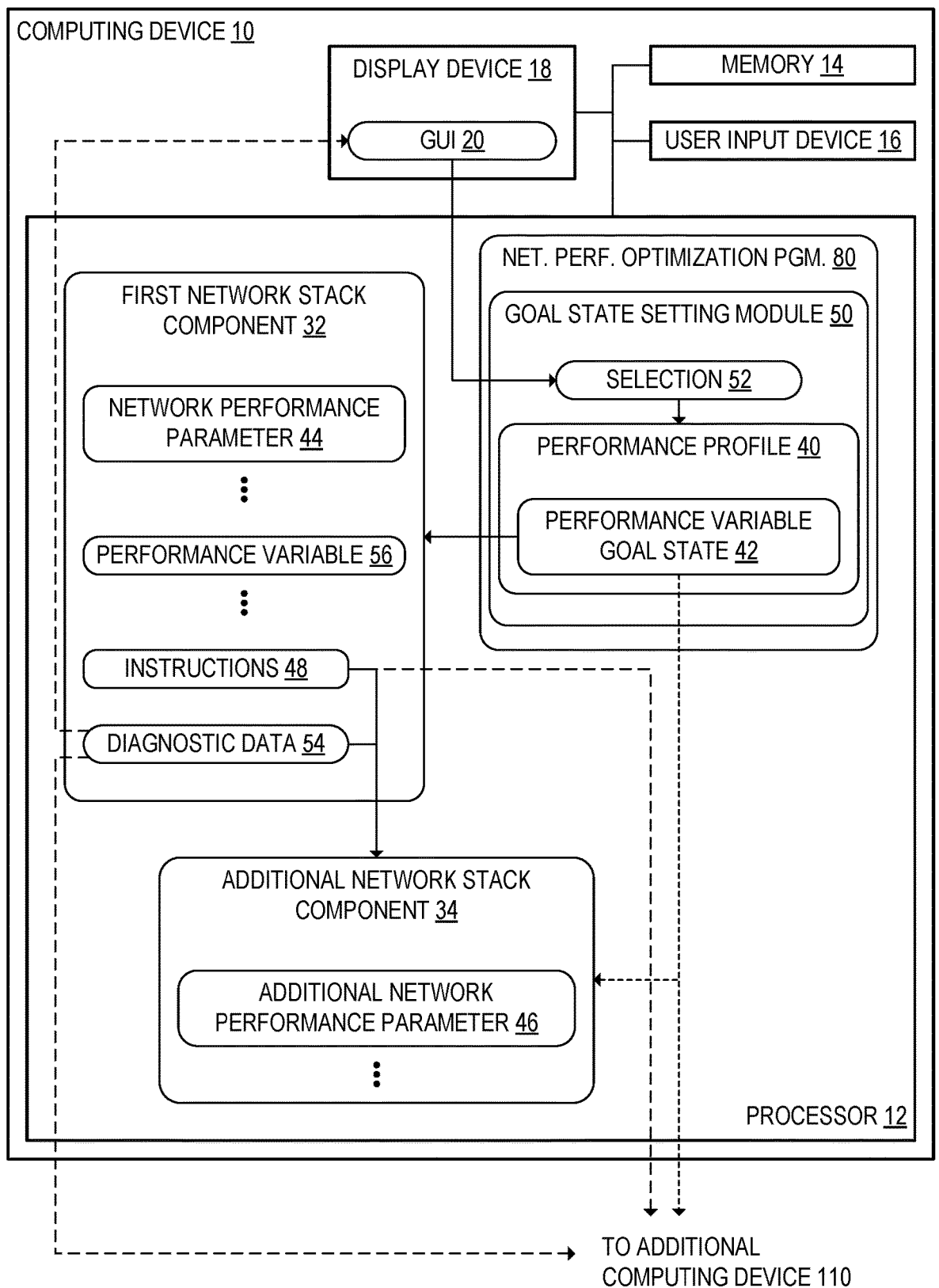
FIG. 4 schematically shows a computing device at which a first network stack component is executed, according to the example of FIG. 1.

FIG. 4 schematically shows the computing device 10 in additional detail when a performance profile 40 is selected at the GUI 20. Via the one or more user input devices 16, the processor 12 may be further configured to receive, at the performance profile selection interface element 22, a selection 52 of a performance profile 40 of a plurality of performance profiles 40. The selection 52 may be received at a goal state setting module 50 executed at the processor 12, which may be included in the network performance optimization program 80. As discussed above, the plurality of performance profiles 40 that are selectable by the user may be indicated at the performance profile selection interface element 22.

The performance profile 40 may indicate a performance variable goal state 42 for the first network stack component 32. The performance variable goal state 42 may be an optimization target for the first network stack component 32 that is expressed in terms of the values of one or more performance variables 56. The one or more performance variables 56 may, for example, include a number of connections per second, a connection latency, a total throughput, a number of cycles per byte, or some other variable that indicates network performance. The performance variable goal state 42 may be a connections-per-second maximization goal state, a latency minimization goal state, a throughput maximization goal state, a cycles-per-byte minimization goal state, or some combination thereof. In the example of FIG. 3, the goals for the browser performance profile are shown as low latency and high connections-per-second. In examples in which the performance variable goal state 42 is expressed as a loss function, the loss function may be expressed as a sum of a plurality of terms that each depend upon a respective performance variable 56.

In response to receiving the selection 52 of the performance profile 40, the processor 12 may be further configured to control one or more network performance parameters 44 of the first network stack component 32 such that the one or more performance variables 56 of the first network stack component 32 approach the performance variable goal state 42. The one or more network performance parameters 44 may include, for example, a TCP window size 44A, a virtual machine switch batch size 44B, a NIC interrupt moderation setting 44C, a NIC maximum transfer unit (MTU) size 44D, a hyperthreading setting 44E of the processor 12, and a power consumption setting 44F of the computing device 10, as shown in the example of FIG. 2. One or more other network performance parameters 44 of the first network stack component 32 may additionally or alternatively be controlled in some embodiments. The hyperthreading setting 44E of the processor 12 may be a setting of whether hyperthreading is enabled or disabled. The power consumption setting 44F may be a setting of whether the computing device 10 is in a power-saving mode. In some examples, the power consumption setting 44F of the computing device 10 has three or more power consumption levels.

In one example, the user selects the file upload performance profile 40E. When the file upload performance profile 40E is selected, the respective TCP window sizes 44A and MTU sizes 44D of the first network stack component 32 and the one or more additional network stack components 34 may be set to the largest sizes supported by subsequent network stack components. When the MTU size 44D is increased, a packet coalescing size may be increased at the cost of increased latency in order to achieve high throughput via bulk transfer. Accordingly, the amount of data included in the packets transmitted through the network stack 30 may be increased, allowing files to be uploaded more quickly. In contrast, when the user selects the gaming performance profile 40D, the first network stack component 32 may reduce the MTU size 44D, thereby reducing the amount of data included in each packet but also reducing the amount of time spent waiting for packets to coalesce. Accordingly, the latency may be reduced.

Continuing with FIG. 4, by adjusting the one or more network performance parameters 44 while the first network stack component 32 is executed, the processor 12 may affect the extent to which the performance variable goal state 42 is achieved. When the processor 12 controls the one or more network performance parameters 44, the processor 12 may be further configured to monitor the values of the one or more performance variables 56 indicated in the performance variable goal state 42 and dynamically adjust the one or more network performance parameters 44 based at least in part on the detected values of the one or more performance variables 56, in an attempt to achieve the goal state.

In some examples, the performance variable goal state 42 is expressed as a loss function for the first network stack component 32. The processor 12 may, in such examples, be configured to adjust the one or more network performance parameters 44 based at least in part on the value of the loss function, such as by executing a reinforcement learning algorithm. In examples in which the processor 12 is configured to execute a reinforcement learning algorithm when modifying the one or more network performance parameters 44, the performance profile 40 may include the weights of the reinforcement learning algorithm. The processor 12 may be further configured to update the weights of the reinforcement learning algorithm during execution of the first network stack component 32 such that the reinforcement learning algorithm converges more quickly and reliably to values of the one or more network performance parameters 44 that result in low values of the loss function.

In response to receiving the selection 52 of the performance profile 40, the processor 12 may be further configured to transmit, to one or more additional network stack components 34 of the plurality of network stack components, instructions 48 to control one or more additional network performance parameters 46 of the one or more additional network stack components 34. The instructions 48 may be instructions to control the one or more additional network performance parameters 46 such that the one or more performance variables 56 of the first network stack component 32 approach the performance variable goal state 42. Accordingly, the first network stack component 32 and the one or more additional network stack components 34 may cooperate such that the first network stack component 32 approaches the performance variable goal state 42. The one or more additional network performance parameters 46 may, for example, include one or more of the TCP window size 44A, the VM switch batch size 44B, the NIC interrupt moderation setting 44C, the NIC MTU size 44D, the hyperthreading setting 44E of the processor 12, and the power consumption setting 44F of the computing device 10. Additionally or alternatively, the one or more additional network parameters 46 may include one or more parameters of an additional network stack component 34 executed at another computing device, such as a NAT setting 46A of a NAT process 88 executed at a router 110A.

In some examples, the instructions 48 to control the one or more additional network performance parameters 46 of the one or more additional network stack components 34 may be transmitted to the one or more additional computing devices 110 on which the one or more additional network stack components 34 are executed. Additionally or alternatively, the instructions 48 may be transmitted to one or more additional network stack components 34 that are executed locally at the processor 12. In examples in which the instructions 48 are transmitted to an additional computing device 110, the one or more additional network performance parameters 46 may further include a hyperthreading setting of the additional device processor 112 and/or a power consumption setting of the additional computing device 110.

As each additional network stack component 34 may be located at a different network stack layer 36 from the first network stack component 32, the additional network stack component 34 and the first network stack component 32 may have different sets of network performance parameters of which respective values may be modified. Accordingly, the processor 12 is, in some examples, configured to transmit instructions 48 to control one or more additional network performance parameters 46 to the additional network stack component 34. Additionally or alternatively, the processor 12 may be configured to transmit the performance profile 40 to the additional network stack component 34.

In the example discussed above in which the instructions 48 are instructions to increase a TCP window size 44A and an MTU size 44D, the instructions 48 may be transmitted to the additional network stack component 34 via an application-programming interface (API) call or through a notification to which the additional network stack component 34 subscribes. The network stack components may, for example, each include a respective callback function that is called by an operating system when the performance profile 40 changes. When the callback function of a network stack component is invoked, that network stack component may modify its network performance parameters and may additionally or alternatively notify one or more additional network stack components 34 that are downstream in the network stack 30.

In some examples, an additional network stack component 34 of the one or more additional network stack components 34 is configured to receive respective instructions 48 from a plurality of network stack components that each have a same performance profile 40. For example, the network stack components that have the same performance profile 40 may be executed at a plurality of compute nodes that are located in a data center and are included in a cloud computing environment. In examples in which the additional network stack component 34 receives respective instructions 48 from a plurality of network stack components that have the same performance profile 40, the processor 12 or additional device processor 112 at which the additional network stack component 34 is executed may be configured to control the one or more additional network performance parameters 46 such that the one or more performance variables 56 indicated in the performance profile 40 concurrently approach the performance variable goal state 42 at the plurality of network stack components.

In some examples, as shown in FIG. 4, the processor 12 is further configured to generate diagnostic data 54 for the first network stack component 32. The diagnostic data 54 may indicate one or more respective values of the one or more performance variables 56 of the first network stack component 32 during execution of the first network stack component 32. The processor 12 may be further configured to output the diagnostic data 54 to the one or more additional network stack components 34. In some examples, when the processor 12 outputs the diagnostic data 54, the processor 12 is configured to output the diagnostic data 54 to the one or more additional computing devices 110. Additionally or alternatively, the processor 12 may be configured to convey the diagnostic data 54 to one or more additional network stack components 34 executed locally at the processor 12. The processor 12 may be further configured to store the diagnostic data 54 in non-volatile storage included in the memory 14.

The processor 12 or the additional device processor 112 at which the additional network stack component 34 is executed may be configured to determine, based at least in part on the diagnostic data 54, the extent to which the one or more performance variables 56 of the first network stack component 32 satisfy the performance variable goal state 42. The processor 12 or the additional device processor 112 may be further configured to modify the one or more additional network performance parameters 46 based at least in part on the one or more respective values of the one or more performance variables 56 indicated in the diagnostic data 54. Thus, the processor 12 or the additional device processor 112 at which the additional network stack component 34 is executed may be configured to control the one or more additional network performance parameters 46 based at least in part on both the performance variable goal state 42 and the diagnostic data 54.

Figure 5A:
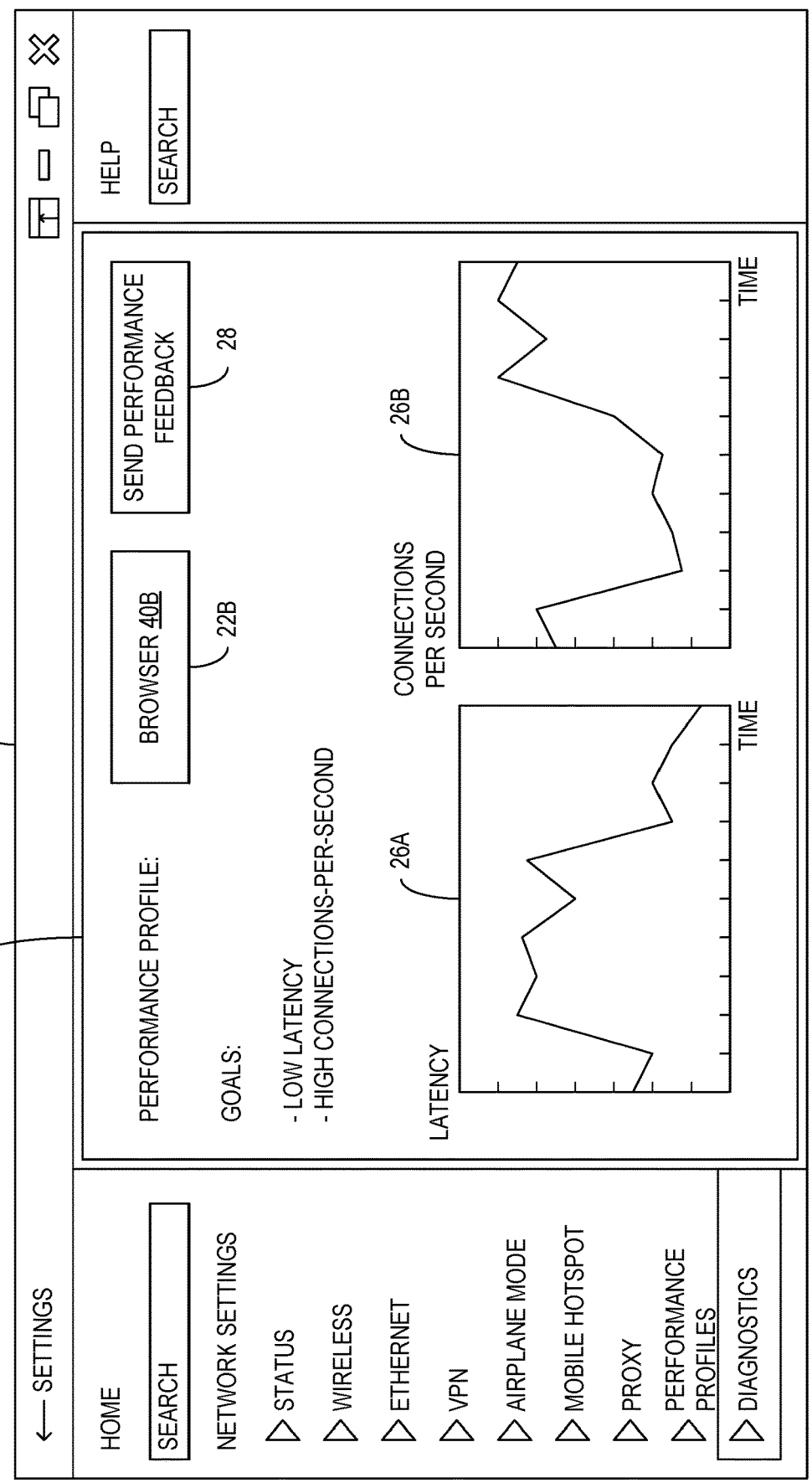
FIG. 5A shows the example GUI of FIG. 3 when diagnostic data for the first network stack component is displayed and when the first network stack has a browser performance profile.

In some examples, the processor 12 is further configured to output at least a portion of the diagnostic data 54 at the GUI 20. FIG. 5A shows the example GUI 20 of FIG. 3 when diagnostic data 54 is displayed. The performance profile 40 is the browser performance profile 40B in the example of FIG. 5A. As shown in the example of FIG. 5A, the one or more performance variables 56 for which the diagnostic data 54 is displayed may be the one or more performance variable 56 indicated in the performance variable goal state 42. The GUI 20 depicted in the example of FIG. 5A includes a diagnostic data interface element 26 that includes a latency interface element 26A and a connections-per-second interface element 26B. The latency interface element 26A is a plot of latency as a function of time for the first network stack component 32. The connections-per-second interface element 26B is a plot of connections per second as a function of time for the first network stack component 32. In other examples, the GUI 20 further displays diagnostic data 54 for at least one other performance variable 56 not indicated by the performance variable goal state 42. By outputting the diagnostic data 54 to the user at the GUI 20, the processor 12 may provide the user with feedback on networking performance of the computing device 10. This feedback may allow the user to specify settings that more closely reflect the user's network performance goals for the first network stack component 32. For example, the user may select a different performance profile 40 at the GUI 20 when a current performance profile 40 does not meet the user's network performance goals, as indicated by the diagnostic data 54.

In some examples, as depicted in FIG. 5A, the GUI 20 further includes a feedback output interface element 28. When the user selects the feedback output interface element 28, the processor 12 may be further configured to transmit the diagnostic data 54 to the one or more additional network stack components 34 as discussed above. In some examples, rather than transmitting the diagnostic data 54 to the one or more additional network stack components 34 continuously or at a predefined time interval when the first network stack component 32 is executed, the processor 12 is configured to transmit the diagnostic data to the one or more additional network stack components 34 in response to receiving a selection of the feedback output interface element 28. Accordingly, the user may instruct the processor 12 to transmit the diagnostic data 54 when a typical network performance conditions occur or when it is convenient for the user to provide a provide a diagnostic data update to the one or more additional network stack components 34 without incurring a bandwidth overhead cost that would be associated with transmitting the diagnostic data 54 to the one or more additional network stack components 34 continuously or at a predefined time interval.

Figure 5B:
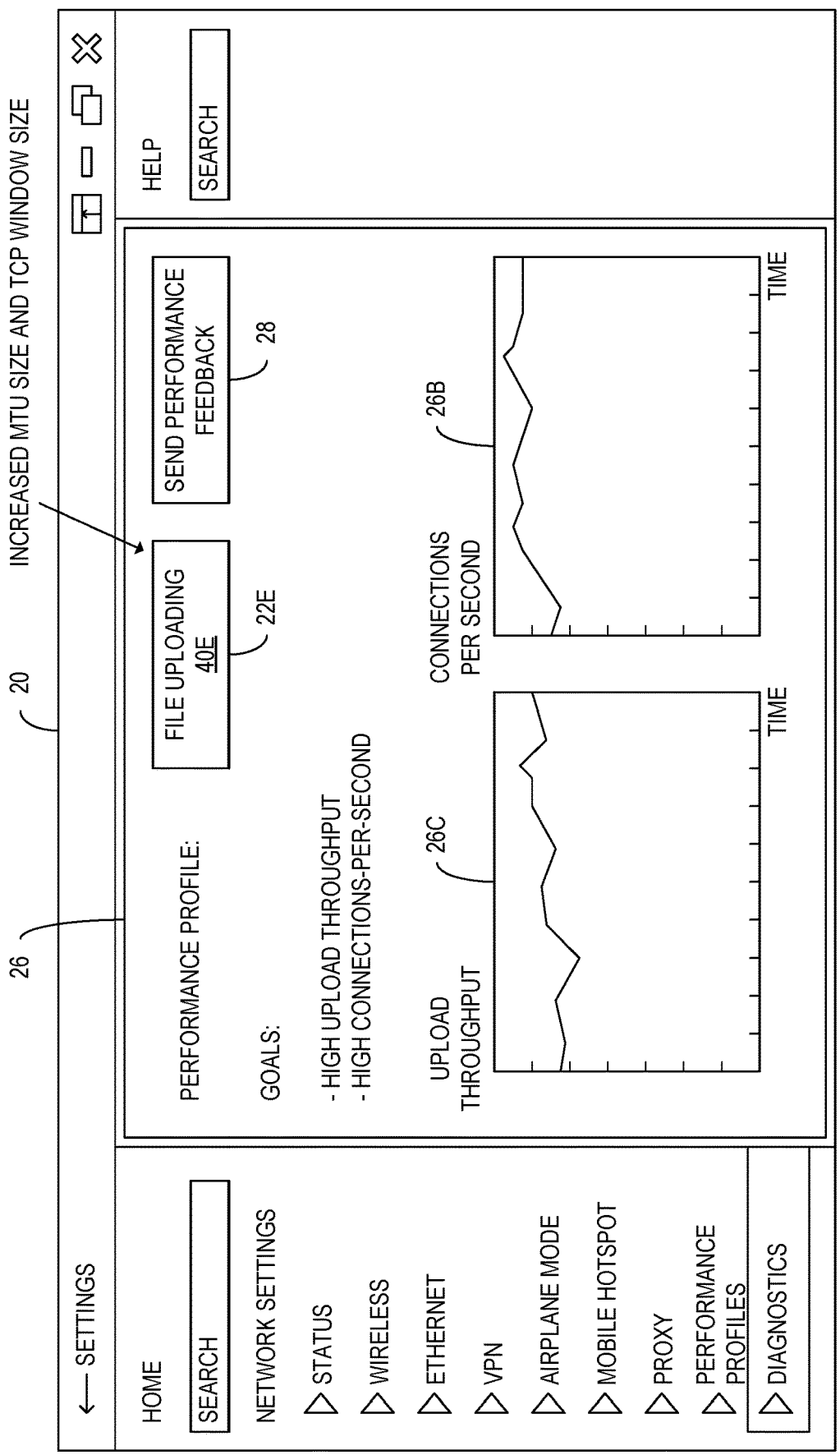
FIG. 5B shows the example GUI of FIG. 3 when diagnostic data for the first network stack component is displayed and when the first network stack has a file upload performance profile.

FIG. 5B shows the GUI 20 after the user has switched the performance profile 40 from the browser performance profile 40B to the file upload performance profile 40E. Instead of the low latency goal of the browser performance profile 40B, the file upload performance profile 40E may include a high upload throughput goal. Both the browser performance profile 40B and the file upload performance profile 40E may both include a high connections-per-second goal. A connections-per-second interface element 26B and an upload throughput interface element 26C that respectively show plots of connections per second and upload throughput as functions of time may be displayed at the GUI 20 when the first network stack component 32 and the one or more additional network stack components 34 have the file upload performance profile 40E. When the file upload performance profile 40E is applied to the first network stack component 32 and the one or more additional network stack components 34, the TCP window size 44A and the MTU size 44D of the first network stack component 32 and/or the one or more additional network stack components 34 may be increased, as discussed above. Using this interface, it will be appreciated that a user may view historical trends in performance, for example, before, during, and after a particular performance profile has been applied.

Figure 6:
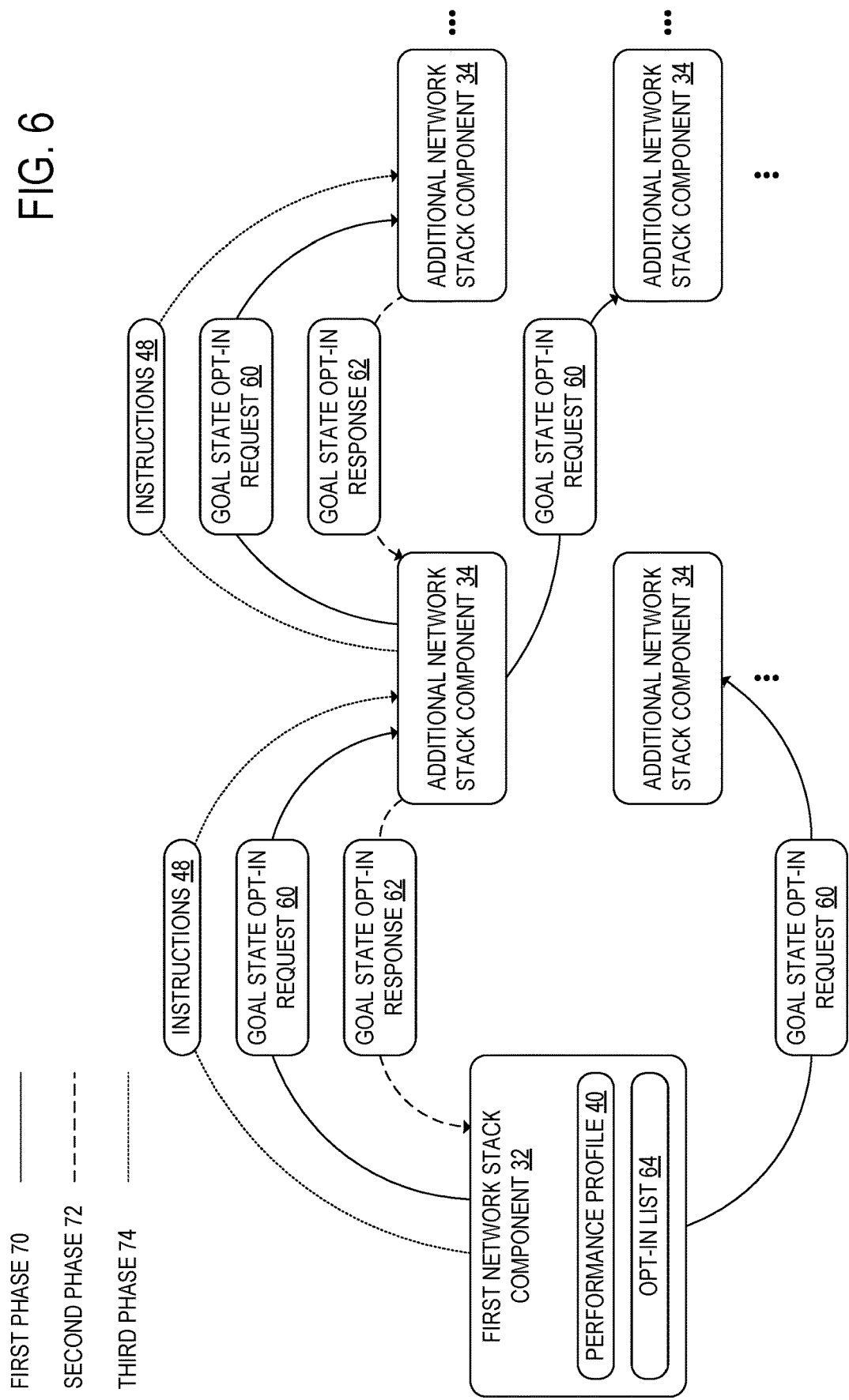
FIG. 6 schematically shows the network stack when a plurality of goal state opt-in requests are transmitted to a respective plurality of additional network stack components, according to the example of FIG. 1.

Turning now to FIG. 6, the processor 12 is, in some examples, configured to transmit the instructions 48 to control the one or more additional network performance parameters 46 to one or more additional network stack components 34 that have opted into receiving the instructions 48. In such examples, the processor 12 may be configured to not transmit the instructions 48 to one or more additional network stack components 34 that are included in the network stack 30 but have not opted in. During a first phase 70, the processor 12 may be configured to transmit a respective plurality of goal state opt-in requests 60 to a plurality of additional network stack components 34 including the one or more additional network stack components 34 to which the instructions 48 are later transmitted. In some examples, as shown in FIG. 6, the plurality of goal state opt-in requests 60 are transmitted between the additional network stack components 34 as specified by the network topology of the network stack 30.

During a second phase 72, the processor 12 may be further configured to receive one or more respective goal state opt-in responses 62 from the one or more additional network stack components 34. Each goal state opt-in response 62 may indicate that the corresponding additional network stack component 34 opts into receiving the instructions 48 to control the one or more additional network performance parameters 46. The plurality of additional network stack components 34 may also include one or more additional network stack components 34 that do not opt into receiving the instructions 48.

During a third phase 74, the processor 12 may be further configured to transmit the instructions 48 to control the one or more additional network performance parameters 46 of the one or more additional network stack components 34 to the one or more additional network stack components 34 from which the goal state opt-in responses 62 were received, subsequently to receiving the one or more goal state opt-in responses 62. Accordingly, the one or more additional network stack components 34 may opt into coordinating with the first network stack component 32 to cause the one or more performance variables 56 of the first network stack component 32 to approach the performance variable goal state 42. At least one additional network stack component 34, such as an additional network stack component 34 that receives packets from a large number of network stack components with different performance goals, may also decline the goal state opt-in request 60.

Figure 7:
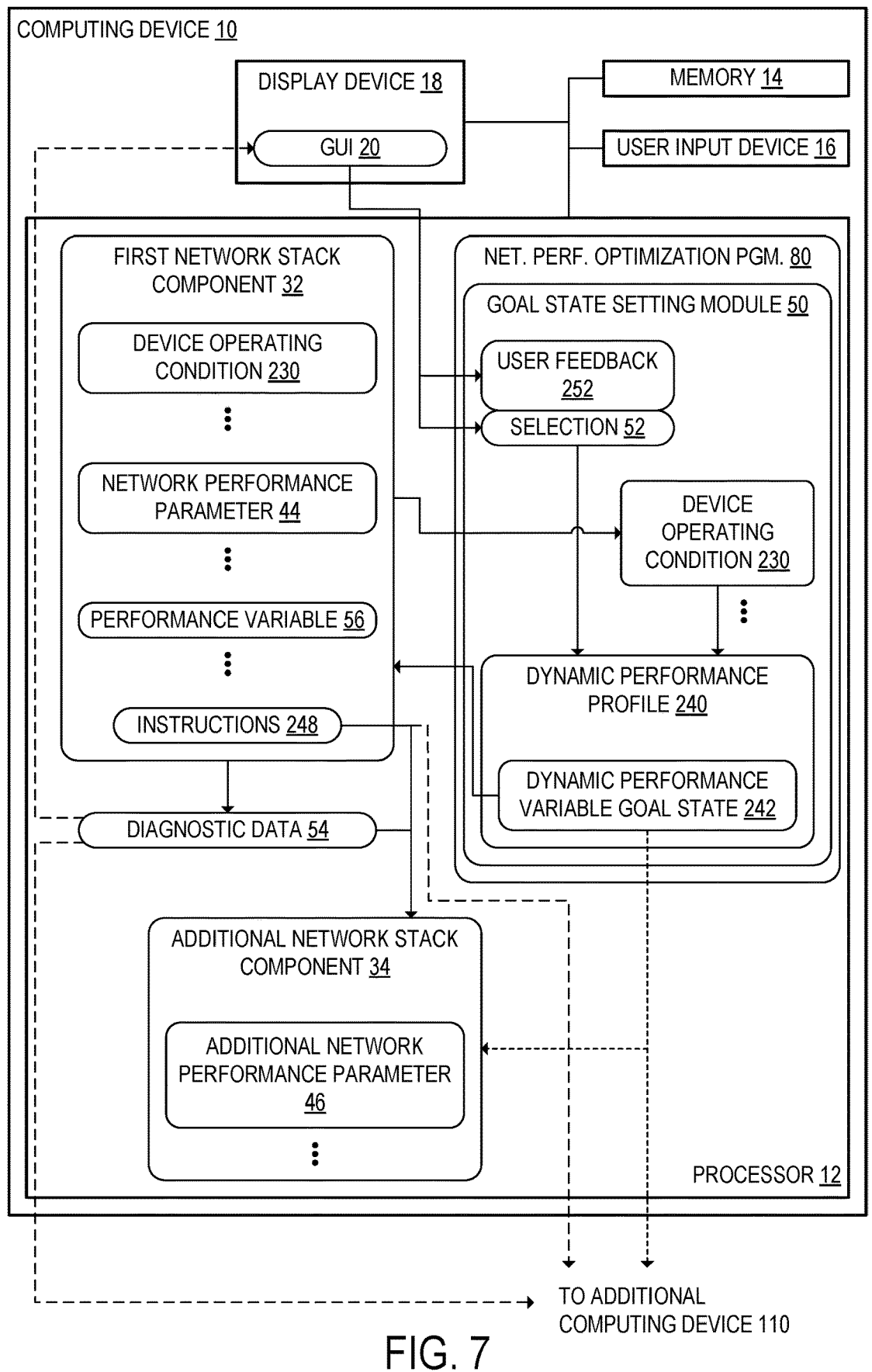
FIG. 7 schematically shows the computing device when the first network stack component has a dynamic performance profile, according to the example of FIG. 1.

Turning now to the example of FIG. 7, the performance profile for the first network stack component 32 may be a dynamic performance profile 240. The dynamic performance profile 240 may include a dynamic performance variable goal state 242 that the processor 12 is configured to update during execution of the first network stack component 32. For example, the dynamic performance variable goal state 242 may be updated based at least in part on a plurality of device operating conditions 230 of the computing device 10. The device operating conditions 230 may be conditions of one or more hardware components that affect operation of the computing device 10 when executing the first network stack component 32 but are not included among the one or more performance variables 56. The processor 12 may be configured to detect the plurality of device operating conditions 230 of the one or more hardware components of the computing device 10 during execution of the first network stack component 32. For example, the plurality of device operating conditions 230 may include at least one of an amount of available memory, an amount of available electrical power, and a deferred procedure call (DPC) duration for the computing device 10. The amount of available electrical power may be an indication of whether the computing device 10 is using mains power or battery power, and, when the computing device 10 is using battery power, a remaining charge of the battery. Detecting other types of device operating conditions 230 is also contemplated.

In examples in which the performance profile is a dynamic performance profile 240, as shown in FIG. 7, the processor 12 may be further configured to modify the dynamic performance variable goal state 242 based at least in part on the device operating conditions 230. The modifications made to the dynamic performance variable goal state 242 may be specified by the dynamic performance profile 240. For example, the dynamic performance profile 240 may include a function that maps device operating conditions 230 to a plurality of coefficients of terms included in a goal state loss function. Thus, the weighting of different performance variables 56 may be modified based at least in part on the device operating conditions 230 as those device operating conditions 230 change during execution of the first network stack component 32.

In some examples in which a dynamic performance profile 240 is used, the processor 12 is further configured to transmit instructions 248 to the one or more additional network stack components 34 to control the one or more additional network performance parameters 46 based at least in part on the plurality of device operating conditions 230. In such examples, the processor 12 may be further configured to transmit indications of at least a portion of the device operating conditions 230 to the one or more additional network stack components 34. At the one or more additional network stack components 34, the one or more additional network performance parameters 46 may be modified based at least in part on the indications of the device operating conditions 230. For example, when the one or more network performance parameters 44 include a hyperthreading setting of the processor 12 and/or a power consumption setting of the computing device 10, a processor utilization level of the processor 12 and/or an electrical power consumption level of the computing device 10 may be included in the indication of the device operating conditions 230 that is transmitted to the one or more additional network stack components 34. In such examples, the one or more additional network performance parameters 46 of the one or more additional network stack components 34 may be dynamically adjusted based at least in part on the processor utilization level and/or the electrical power consumption level.

Figure 8:
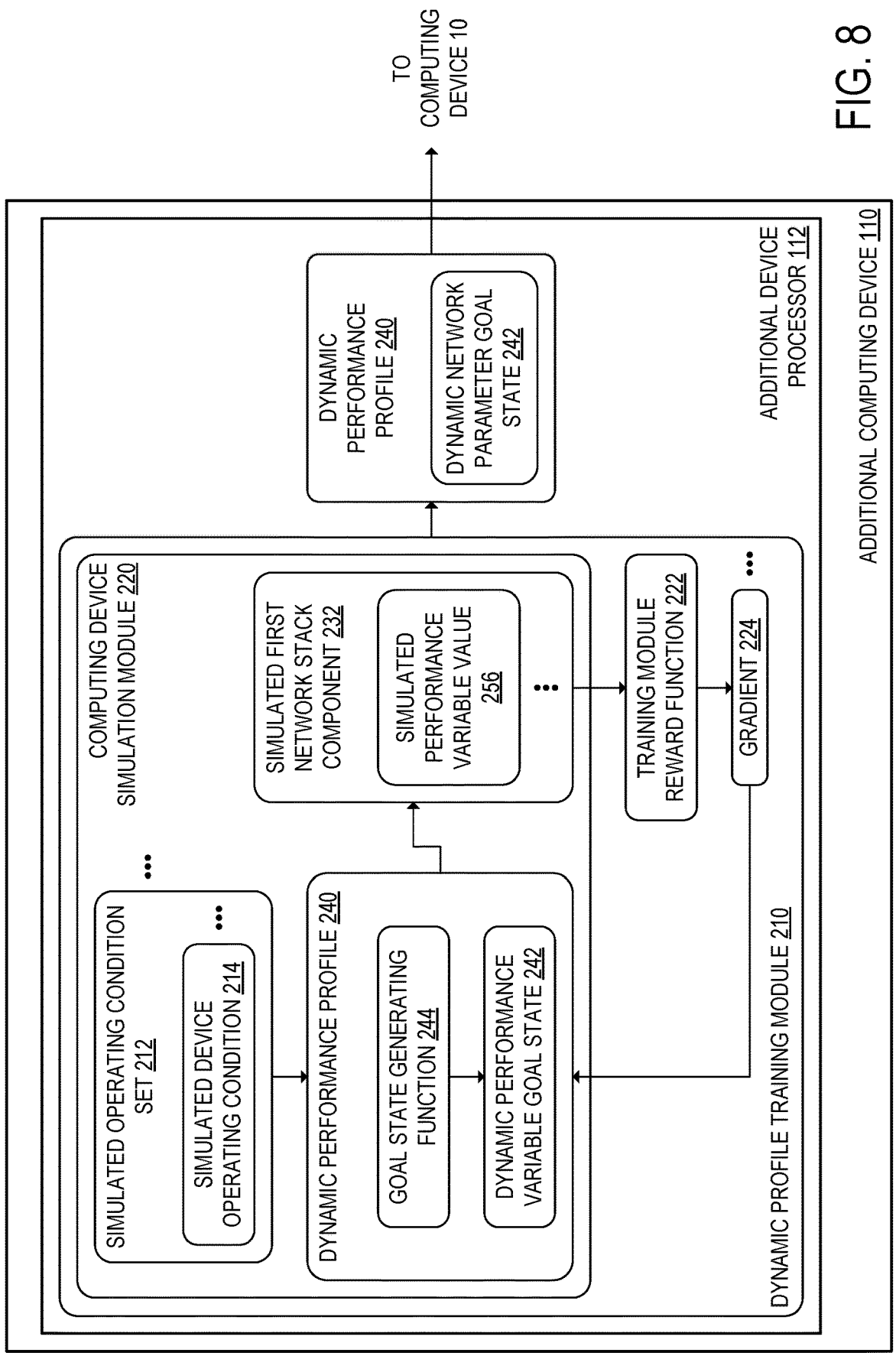
FIG. 8 schematically shows an additional computing device when a dynamic profile training module is executed, according to the example of FIG. 1.

In some examples in which the performance profile is a dynamic performance profile 240, the dynamic performance profile 240 is generated at least in part via machine learning. FIG. 8 shows an example of a dynamic profile training module 210 at which the dynamic performance profile 240 may be trained in such examples. The dynamic profile training module 210 may, for example, be executed at the processor 12 of the computing device, an additional device processor 12 of an additional computing device 110 that participates in the network stack 30, or some other computing device. The dynamic performance profile 240 is generated at a plurality of computing devices, in some examples. For example, the dynamic performance profile 240 may be received at the processor 12 from an additional computing device 110 and subjected to additional training such that the dynamic performance profile 240 is fine-tuned for use at the computing device 10. In the example of FIG. 8, the dynamic profile training module 210 is executed at the additional device processor 112 of an additional computing device 110 that participates in the network stack 30.

Executing the dynamic profile training module 210 may include receiving, at the additional device processor 112, training data including a plurality of simulated operating condition sets 212. The simulated operating condition sets 212 may each include a plurality of simulated device operating conditions 214 for the computing device 10. For example, one particular simulated operating condition set 212 may include simulated device operating conditions 214 according to which the computing device 10 is simulated to have low memory availability, a high DPC duration, and a high amount of available electrical power. In some examples, the simulated operating condition sets 212 are generated at a computing device simulation module 220 at which a simulated first network stack component 232 is configured to be executed under the simulated device operating conditions 214 included in the simulated operating condition sets 212.

At the computing device simulation module 220, for each simulated operating condition set 212, the additional device processor 112 may be further configured to input the simulated device operating conditions 214 included in that simulated operating condition set 212 into the dynamic performance profile 240 that is undergoing training. The dynamic performance profile 240 may include a dynamic performance variable goal state 242 for a simulated first network stack component 232 when the computing device 10 has those simulated device operating conditions 214. The additional device processor 112 may be configured to generate the dynamic performance variable goal state 242 at least in part by evaluating a goal state generating function 244 that takes the simulated device operating conditions 214 as input. During the training process, the goal state generating function 244 may be iteratively updated. The additional device processor 112 may be further configured to execute the simulated first network stack component 232 with the dynamic performance profile 240 and compute one or more simulated performance variable values 256 of one or more performance variables 56 of the simulated first network stack component 232.

The dynamic profile training module 210 may further include a training module reward function 222. The training module reward function 222 may specify a reward for the dynamic performance profile 240 as a function of the one or more simulated performance variable values 256. For example, the training module reward function 222 may include a respective term corresponding to each of a plurality of performance variables 56 for the first network stack component 32 that is simulated at the computing device simulation module 220. The training module reward function 222 may specify a user's goals for the behavior of the dynamic performance profile 240 under different device operating conditions 230. For each simulated operating condition set 212, the additional device processor 112 may be further configured to compute a value of the training module reward function 222 based at least in part on the one or more simulated performance variable values 256 when the simulated first network stack component 232 is modeled for that simulated operating condition set 212.

The additional device processor 12 may be further configured to compute a gradient 224 of the training module reward function 222 for each simulated operating condition set 212 and may be further configured to perform gradient descent at the dynamic performance profile 240 using the computed values of the gradient 224. When gradient descent is performed at the dynamic performance profile 240, the goal state generating function 244 may be updated. Accordingly, the additional device processor 112 may be configured to train the dynamic performance profile 240. The additional device processor 112 may be further configured to convey the trained dynamic performance profile 240 to the computing device 10 for execution at runtime.

Returning to FIG. 7, when the dynamic performance profile 240 is used at runtime, the diagnostic data 54 may be output for display at the GUI 20 as discussed above with reference to FIGS. 5A and 5B. If the user determines, from the diagnostic data 54, that the dynamic performance profile 240 is not properly pursuing the user's performance goals for the first network stack component 32, the user may switch to a non-dynamic performance profile 40. For example, the dynamic performance variable goal state 242 of the dynamic performance profile 240 may fail to match the goal specified in the training module reward function 222 when the performance variables 56 of the first network stack component 32 have values that are significantly different from the simulated device operating conditions 214 included in the simulated operating condition set 212 (e.g., when the dynamic performance profile 240 operates outside its training distribution). In such examples, the processor 12 may be further configured to perform additional training at the dynamic performance profile 240 in response to receiving user feedback 252 indicating that the dynamic performance profile 240 is not pursuing the user's performance goals. When such additional training is performed, the values of one or more performance variables 56 when the user feedback 252 is received may be used as additional training data. In addition, the additional training data may further include the device operating conditions 230 of the computing device 10 when the user feedback 252 is received. The objective robustness of the dynamic performance profile 240 may accordingly be increased over time as the dynamic performance profile 240 receives user feedback 252 under different device operating conditions 230.

FIG. 9A shows a flowchart of an example method 300 for use with a computing device. The method 300 may be performed at the computing device 10 of FIG. 1 or at some other computing device. At step 302, the method 300 includes receiving a selection of a performance profile of a plurality of performance profiles. The performance profile may indicate a performance variable goal state for a first network stack component included in a network stack of a plurality of network stack components. The network stack components may be computing processes that are communicatively connected to each other in a network topology and that communicate with each other according to one or more networking protocols. When the first network stack component is executed, the computing device may communicate with one or more additional computing devices. Each network stack component of the plurality of network stack components may, for example, be a Transmission Control Protocol/Internet Protocol (TCP/IP) process, network address translation (NAT) process, a virtual machine switch, or a network interface controller (NIC) driver.

At step 304, in response to receiving the selection of the performance profile, the method 300 further includes controlling a network performance parameter of the first network stack component such that a performance variable of the first network stack component approaches the performance variable goal state. The network performance parameters may, for example, be a TCP window size, a virtual machine switch batch size, a NIC interrupt moderation setting, a NIC maximum transfer unit (MTU) size, a hyper-threading setting of a processor included in the computing device, or a power consumption setting of the computing device. In some examples, a plurality of network performance parameters of the first network stack component may be controlled.

The performance variable goal state may be an optimization target for the first network stack component that is expressed in terms of one or more performance variables of the first network stack component. For example, the performance variable goal state may be a connections-per-second maximization goal state, a latency minimization goal state, a throughput maximization goal state, or a cycles-per-byte minimization goal state for the first network stack component. In some examples, the performance variable goal state may be a goal state for a plurality of performance variables of the first network stack component. In some examples, controlling the network performance parameter such that the performance variable approach the performance variable goal state includes executing a reinforcement learning algorithm included in the performance profile.

At step 306, in response to receiving the selection of the performance profile, the method 300 further includes transmitting, to an additional network stack component of the plurality of network stack components, instructions to control an additional network performance parameter of the additional network stack component such that the performance variable of the first network stack component approaches the performance variable goal state. The additional network stack component of the plurality network stack components may be executed at the computing device or at an additional computing device. Thus, the instructions to control the additional network performance parameter of the additional network stack component may be transmitted to an additional computing device in some examples. Similarly to the network performance parameter of the first network stack component, the additional network performance parameter of the additional network stack component may, for example, be a TCP window size, a virtual machine switch batch size, a NIC interrupt moderation setting, a NIC maximum transfer unit (MTU) size, a hyperthreading setting of the processor or an additional device processor, and/or a power consumption setting of the computing device or the additional computing device. In some examples, the instructions to control the additional network performance parameter are transmitted across multiple layers of network stack components. By transmitting the instructions to control the additional network performance parameter of the additional network stack component, the network stack may be aligned to the performance variable goal state of the first network stack component. In some examples, instructions to control a plurality of respective additional network performance parameters may be transmitted to a plurality of additional network stack components.

Figure 9B:
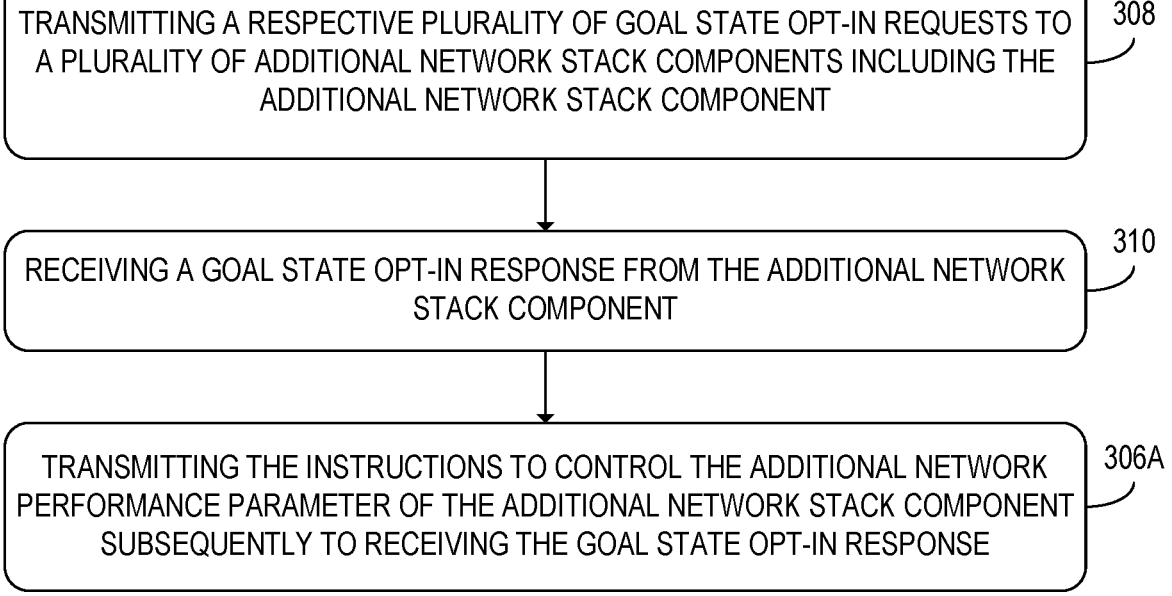
FIGS. 9B-9E show additional steps of the method of FIG. 9A that may be performed in some examples.

FIG. 9B shows additional steps of the method 300 that may be performed in some examples. At step 308, the method 300 further includes transmitting a respective plurality of goal state opt-in requests to a plurality of additional network stack components including the additional network stack component. For example, step 308 may be performed prior to executing the first network stack component. Alternatively, step 308 may be performed subsequently to receiving the selection of the performance profile at the GUI in step 302. The goal state opt-in request may indicate the performance variable goal state of the selected performance profile in examples in which the goal state opt-in request is transmitted to the plurality of additional network stack components subsequently to the selection of the performance profile.

At step 310, the method 300 further includes receiving a goal state opt-in response from the additional network stack component. In addition, the plurality of additional network stack components to which the goal state opt-in requests are transmitted may include at least one additional network stack component that does not transmit a goal state opt-in response to the computing device. Accordingly, a subset of the plurality of additional network stack components may opt into the performance parameter goal state, rather than all of the additional network stack components. A plurality of the additional network stack components may opt into the performance parameter goal state in some examples.

In examples in which step 308 and step 310 are performed, step 306 of the method 300 may be performed as step 306A. At step 306A, the method 300 further includes transmitting the instructions to control the additional network performance parameter of the additional network stack component subsequently to receiving the goal state opt-in response. Thus, the instructions to control the additional network performance parameter may be transmitted only to the additional network stack component that opts into receiving the instructions. In examples in which a plurality of additional network stack components opt into the performance parameter goal state, the instructions may be transmitted to each of those additional network stack components.

Figure 9C:
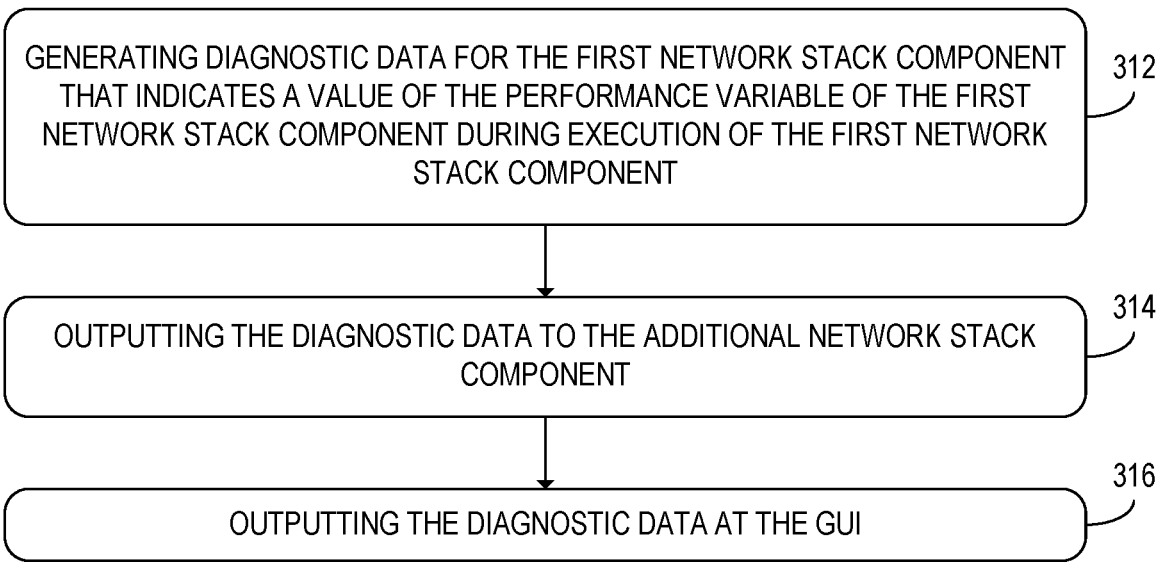

FIG. 9C also shows additional steps of the method 300 that may be performed in some examples. At step 312, the method 300 further includes generating diagnostic data for the first network stack component. The diagnostic data may indicate a value of the performance variable of the first network stack component during execution of the first network stack component.

At step 314, the method 300 further includes outputting the diagnostic data to the additional network stack component. Outputting the diagnostic data to the additional network stack component may allow the additional network stack component to determine the extent to which the value of the performance variable satisfies the performance variable goal state. The adjustments to the additional network performance parameter may be made based at least in part on the value of the performance variable indicated in the diagnostic data.

In some examples, the method 300 further includes, at step 316, outputting the diagnostic data at the GUI. Outputting the diagnostic data at the GUI may allow the user to assess whether the performance profile meets the user's performance goals for the first network stack component. For example, the user may refer to the diagnostic data when determining whether to switch to a different performance profile or customize one or more settings of the performance profile.

Figure 9D:
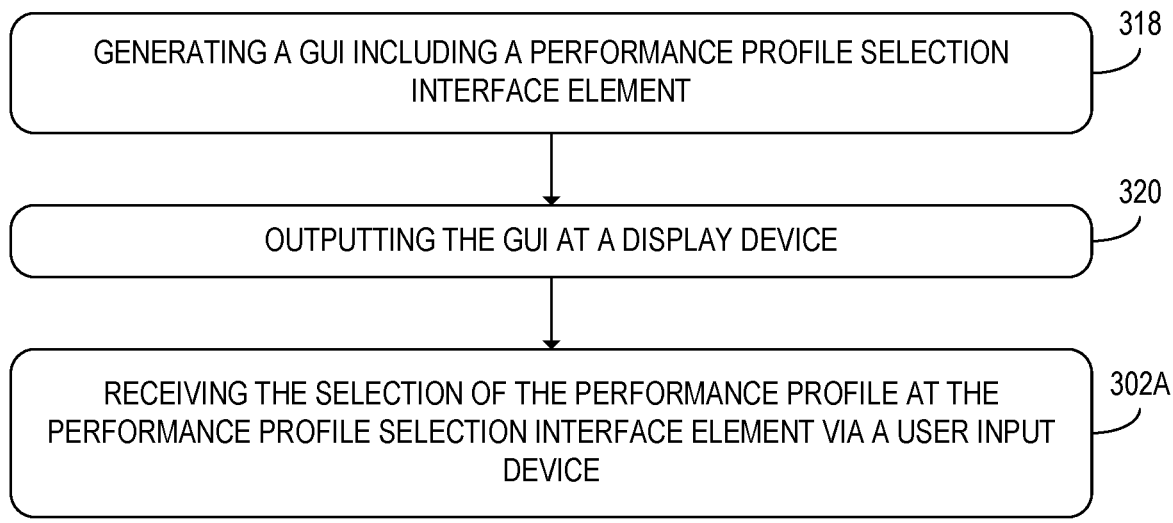

FIG. 9D shows additional steps of the method 300 that may be performed in some examples when the computing device at which the method 300 is performed includes a display device and a user input device. At step 318, the method 300 further includes generating a GUI including a performance profile selection interface element. At step 320, the method 300 further includes outputting the GUI at the display device. At step 302A, which may be performed when performing step 302 of FIG. 9A, the method 300 further includes receiving the selection of the performance profile at the performance profile selection interface element via the user input device. Thus, the user may select the performance profile at the GUI. For example, a plurality of performance profiles respectively associated with different application program types may be presented to the user at the GUI, and the user may select a performance profile that matches the user's networking performance goals.

Figure 9E:
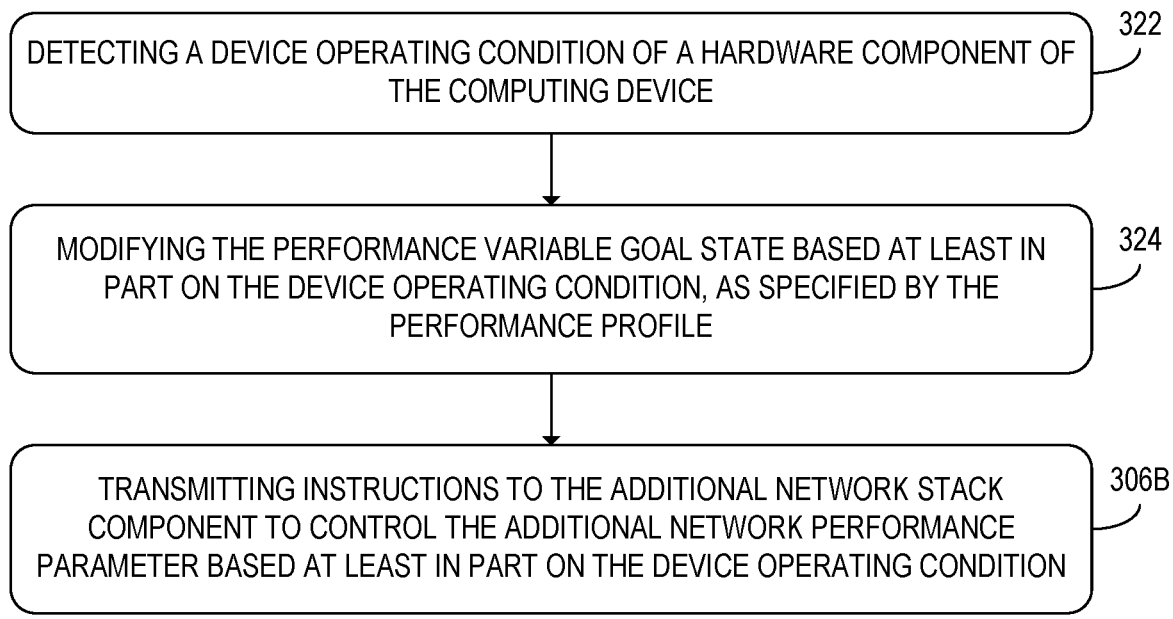

FIG. 9E shows additional steps of the method 300 of FIG. 9A that may be performed in some examples. At step 322, the method 300 further includes detecting a device operating condition of one or more hardware components of the computing device at which the method 300 is performed. For example, the device operating condition may be an amount of available memory, an amount of available electrical power, and/or a deferred procedure call (DPC) duration for the computing device. Other device operating conditions may additionally or alternatively be detected in other examples.

At step 324, the method 300 further includes modifying the performance variable goal state based at least in part on the device operating condition, as specified by the performance profile. The performance profile may express the performance variable goal state as a function of one or more device operating condition values. For example, when the performance variable goal state is expressed as a sum of a plurality of terms that are each functions of respective performance variables, those terms may include coefficients that are dynamically adjusted based on the device operating condition values. Thus, the performance profile may be a dynamic performance profile that includes a dynamic performance variable goal state.

At step 306B, which may be performed when performing step 306 of FIG. 9A, the method 300 further includes transmitting instructions to the additional network stack component to control the additional network performance parameter based at least in part on the device operating condition. Accordingly, the additional network performance parameter may be dynamically modified to reflect changes in the device operating condition of the hardware component of the computing device. In some examples, one or more indications of the device operating condition are transmitted to the additional network stack component. In other examples, the instructions that are transmitted to the additional network stack component are generated based at least in part on the device operating conditions without directly including indications of the device operating conditions.

Figure 10:
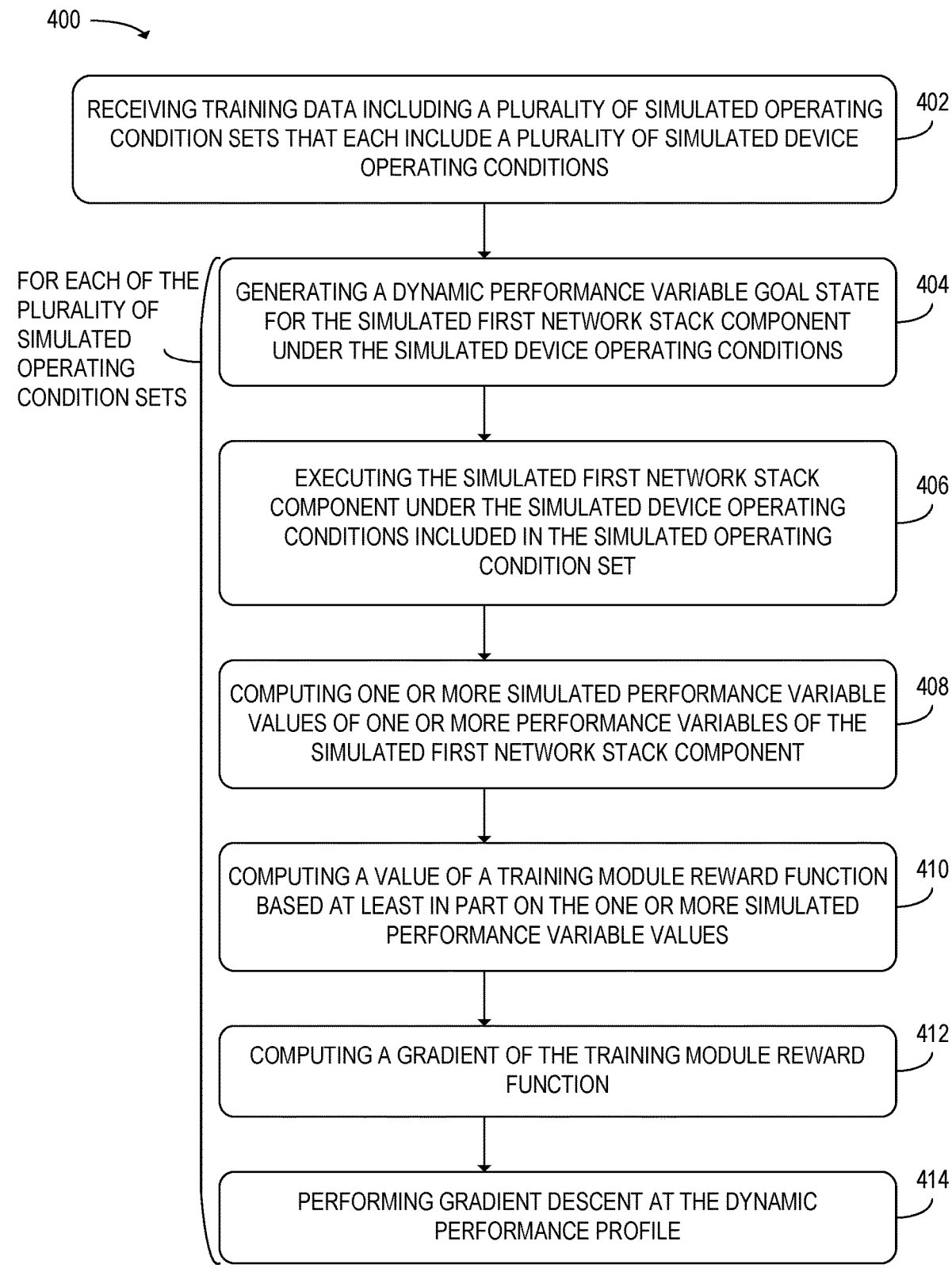
FIG. 10 shows a flowchart of a method for use at a computing device to train a dynamic performance profile for the first network stack component, according to the example of FIG. 1.

In some examples in which the performance profile is a dynamic performance profile, as discussed above with reference to FIG. 9E, the performance profile may be generated at least in part via machine learning. FIG. 10 shows steps of an example method 400 that may be performed at a dynamic profile training module to train the dynamic performance profile. The steps of the method 400 may be performed at the computing device at which the method 300 of FIG. 9A is performed. Additionally or alternatively, the method 400 may be performed at one or more other computing devices. In some examples, initial training of the dynamic performance profile may be performed at another computing device, and the dynamic performance profile may be transmitted to the computing device at which the method 300 is performed. Subsequently to transmitting the dynamic performance profile to the computing device, additional training may be performed on the dynamic performance profile in order to adapt the dynamic performance profile to the hardware configuration of the computing device.

At step 402, the method 400 of FIG. 10 includes receiving training data including a plurality of simulated operating condition sets that each include a plurality of simulated device operating conditions. The simulated device operating conditions may be simulated conditions of one or more hardware components of a computing device that is configured to execute the first network stack component.

The subsequent steps of the method 400 may be performed for each of the plurality of simulated operating condition sets. At step 404, the method 400 further includes generating a dynamic performance variable goal state for the simulated first network stack component under the simulated device operating conditions. The dynamic performance variable goal state may be generated at least in part by executing a goal state generating function that takes the simulated device operating conditions as input. At the beginning of training, the dynamic performance profile may be initialized with a goal state generating function selected randomly or pseudorandomly from a goal state generating function distribution. For example, initializing the goal state generating function may be performed at least in part by initializing a neural network with random or pseudorandom weights. The goal state generating function may be iteratively updated during the subsequent steps of the method 400.

At step 406, the method 400 further includes executing the simulated first network stack component under the simulated device operating conditions included in the simulated operating condition set. The simulated first network stack component may receive simulated communications from, and transmit simulated communications to, one or more simulated additional network stack components. At step 408, the method 400 further includes computing one or more simulated performance variable values of the one or more performance variables of the simulated first network stack component.

At step 410, the method 400 further includes computing a value of a training module reward function based at least in part on the one or more simulated performance variable values computed for the simulated first network stack component. The training module reward function may encode a user's goals for the behavior of the performance profile under different sets of device operating conditions.

At step 412, the method 400 further includes computing a gradient of the training module reward function when the simulated first network stack component has the simulated operating conditions that are currently being used to train the dynamic performance profile. At step 414, the method 400 further includes performing gradient descent at the dynamic performance profile using the computed value of the gradient. Accordingly, the goal state generating function of the dynamic performance profile may be iteratively updated. By repeating steps 404 through 414 for a plurality of simulated operating condition sets, the dynamic performance profile may be trained to adjust the network performance parameters such that the first network stack component fulfills the user's network performance goals under a wide range of device operating conditions.

Figure 11:
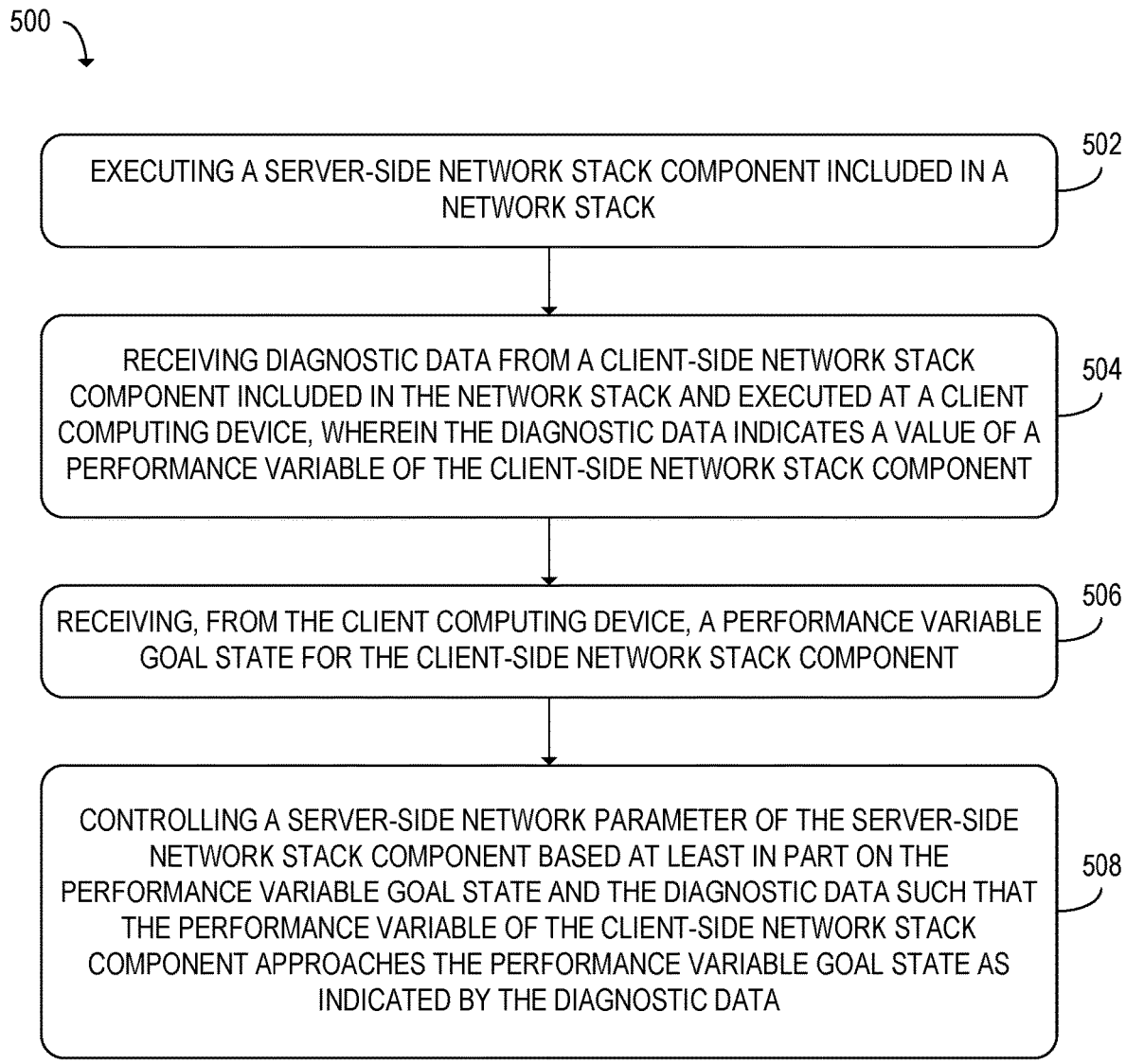
FIG. 11 shows a flowchart of a method for use at a server computing device at which a server-side network stack component is executed, according to the example of FIG. 1.

FIG. 11 shows a flowchart of an example method 500 that may be performed at a server computing device. At step 502, the method 500 includes executing a server-side network stack component included in a network stack of the server computing device. The server-side network stack component may be included among a plurality of additional network stack components and may be configured to communicate directly or indirectly with the first network stack component. The server-side network stack component may be a network stack component that has previously opted into receiving instructions from the client-side network stack component.

At step 504, the method 500 further includes receiving diagnostic data from the client-side network stack component. The client-side network stack component may be included in a network stack of the client computing device and executed at a client computing device, and may, in some examples, be the first network stack component discussed above. In some examples, the network stack on the client computing device may be referred to as a client-side network stack and the network stack on the server computing device may be referred to as a server-side network stack. Likewise, a network stack on an intermediate device such as a router may be referred to as an intermediate device network stack. Because all of these network stacks are used in a single networking communications session, they also may collectively be referred to as a network stack of the computing system including these devices. The diagnostic data may indicate a value of a performance variable of the client-side network stack component. The performance variable may, for example, be a number of connections per second, a connection latency, a total throughput, a number of cycles per byte, or some other variable that indicates network performance of the client-side network stack component. The diagnostic data may include respective values of a plurality of performance variables in some examples.

At step 506, the method 500 further includes receiving, from the client computing device, a performance variable goal state for the client-side network stack component. The performance variable goal state may, for example, be a connections-per-second maximization goal state, a latency minimization goal state, a throughput maximization goal state, or a cycles-per-byte minimization goal state.

In response to receiving the performance variable goal state, the method 500 further includes, at step 508, controlling a server-side network parameter of the server-side network stack component based at least in part on the performance variable goal state and the diagnostic data. The server-side network parameter may be controlled such that the performance variable of the client-side network stack component approaches the performance variable goal state as indicated by the diagnostic data. The server-side network stack component may accordingly collaborate with the client-side network stack component such that the client-side network stack component may more closely fulfill its performance variable goal state.

Using the systems and methods discussed above, a first network stack component executed at a computing device may notify other network stack components of its performance goal. That performance goal may be selected by the user and may differ depending on a type of application executed at the computing device and a role of the first network stack component in the network stack. When the other network stack components receive the notifications of the performance goal of the first network stack component, the other network stack components may adjust their performance parameters to allow the first network stack component to fulfill its performance goals more easily. Accordingly, the first network stack component may achieve its performance goal to a greater extent.

In some embodiments, the methods and processes described herein are tied to a computing system of one or more computing devices. In particular, such methods and processes may be implemented as a computer-application program or service, an API, a library, and/or other computer-program product.

Figure 12:
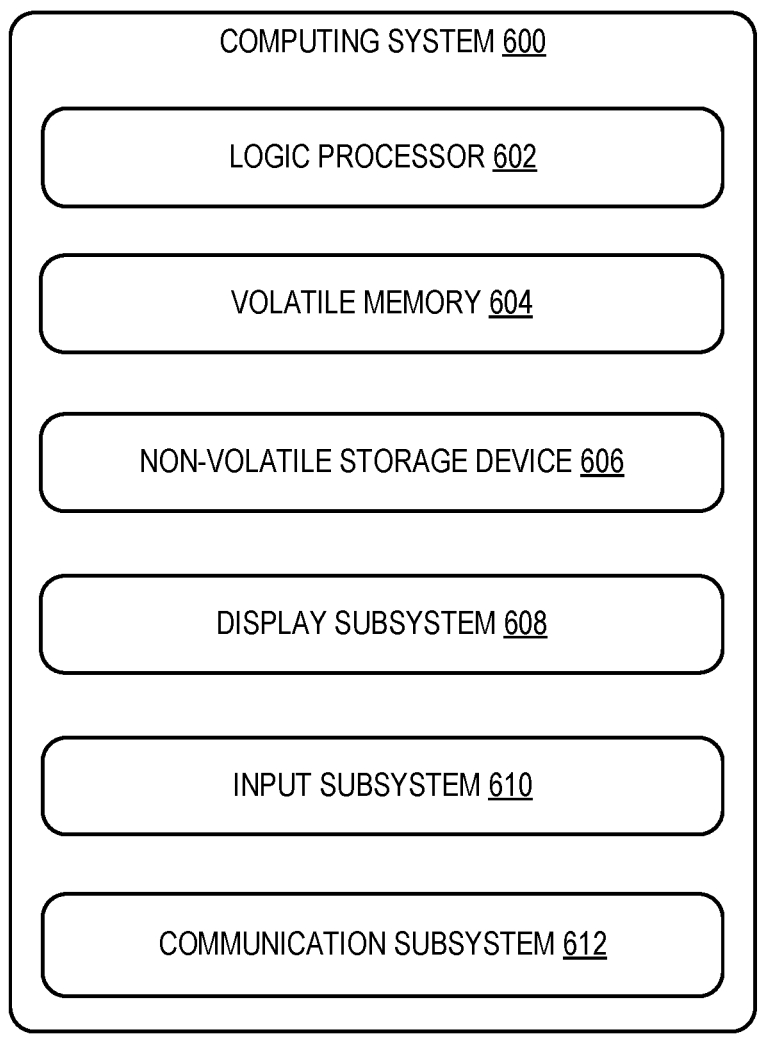
FIG. 12 shows a schematic view of an example computing environment in which the computing device of FIG. 1 may be instantiated.

FIG. 12 schematically shows an embodiment of a computing system 600 that can enact one or more of the methods and processes described above. Computing system 600 is shown in simplified form. Computing system 600 may embody the computing device 10 described above and illustrated in FIG. 1. Components of the computing system 600 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 12.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Non-volatile storage device 606 may include physical devices that are removable and/or built-in. Non-volatile storage device 606 may include optical memory (e.g., CD, DVD, HD-DVD, and Blu-Ray Disc), semiconductor memory (e.g., ROM, EPROM, EEPROM, and FLASH memory), and/or magnetic memory (e.g., hard-disk drive, floppy-disk drive, tape drive, and MRAM), or other mass storage device technology. Non-volatile storage device 606 may include non-volatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As examples, the communication subsystem may be configured for communication via a wireless telephone network, or a wired or wireless local- or wide-area network, such as a HDMI over Wi-Fi connection. In some embodiments, the communication subsystem allows computing system 600 to send and/or receive messages to and/or from other devices via a network such as the Internet.

The following paragraphs discuss several aspects of the present disclosure. According to one aspect of the present disclosure, a computing device is provided, including a processor configured to receive a selection of a performance profile of a plurality of performance profiles. The performance profile may indicate a performance variable goal state for a first network stack component included in a network stack of a plurality of network stack components. In response to receiving the selection of the performance profile, the processor may be further configured to control a network performance parameter of the first network stack component such that a performance variable of the first network stack component approaches the performance variable goal state. The processor may be further configured to transmit, to an additional network stack component of the plurality of network stack components, instructions to control an additional network performance parameter of the additional network stack component such that the performance variable of the first network stack component approaches the performance variable goal state.

According to this aspect, the instructions to control the additional network performance parameter of the additional network stack component may be transmitted to an additional computing device.

According to this aspect, the processor may be further configured to transmit a respective plurality of goal state opt-in requests to a plurality of additional network stack components including the additional network stack component. The processor may be further configured to receive a goal state opt-in response from the additional network stack component. The processor may be further configured to transmit the instructions to control the additional network performance parameter of the additional network stack component subsequently to receiving the goal state opt-in response.

According to this aspect, the processor may be further configured to generate diagnostic data for the first network stack component that indicates a value of the performance variable of the first network stack component during execution of the first network stack component. The processor may be further configured to output the diagnostic data to the additional network stack components.

According to this aspect, the computing device may further include a display device and a user input device. The processor may be further configured to generate a graphical user interface (GUI) including a performance profile selection interface element. The processor may be further configured to output the GUI at the display device. The processor may be further configured to receive the selection of the performance profile at the performance profile selection interface element via the user input device.

According to this aspect, the performance profile selection interface element may indicate respective application program types with which the plurality of performance profiles are associated.

According to this aspect, the processor may be further configured to execute the first network stack component. During the execution of the first network stack component, the processor may be further configured to detect a device operating condition of a hardware component of the computing device. The processor may be further configured to modify the performance variable goal state based at least in part on the device operating condition, as specified by the performance profile.

According to this aspect, the processor may be further configured to transmit instructions to the additional network stack component to control the additional network performance parameter based at least in part on the device operating condition.

According to this aspect, the plurality of device operating conditions may include at least one of an amount of available memory, an amount of available electrical power, and a deferred procedure call (DPC) duration.

According to this aspect, the performance variable goal state may be a connections-per-second maximization goal state, a latency minimization goal state, a throughput maximization goal state, or a cycles-per-byte minimization goal state.

According to this aspect, each network stack component of the plurality of network stack components may be a Transmission Control Protocol/Internet Protocol (TCP/IP) process, a network address translation (NAT) process, a virtual machine switch, or a network interface controller (NIC) driver.

According to this aspect, each of the network performance parameter and the additional network performance parameter may respectively be one of a TCP window size, a virtual machine switch batch size, a NIC interrupt moderation setting, a NIC maximum transfer unit (MTU) size, a hyper-threading setting of the processor, or a power consumption setting of the computing device.

According to another aspect of the present disclosure, a method for use with a computing device is provided. The method may include receiving a selection of a performance profile of a plurality of performance profiles. The performance profile may indicate a performance variable goal state for a first network stack component included in a network stack of a plurality of network stack components. In response to receiving the selection of the performance profile, the method may further include controlling a network performance parameter of the first network stack component such that a performance variable of the first network stack component approaches the performance variable goal state. The method may further include transmitting, to an additional network stack component of the plurality of network stack components, instructions to control an additional network performance parameter of the additional network stack component such that the performance variable of the first network stack component approaches the performance variable goal state.

According to this aspect, the method may further include transmitting a respective plurality of goal state opt-in requests to a plurality of additional network stack components including the additional network stack component. The method may further include receiving a goal state opt-in response from the additional network stack component. The method may further include transmitting the instructions to control the additional network performance parameter of the additional network stack component subsequently to receiving the goal state opt-in response.

According to this aspect, the method may further include generating diagnostic data for the first network stack component that indicates a value of the performance variable of the first network stack component during execution of the first network stack component. The method may further include outputting the diagnostic data to the additional network stack component.

According to this aspect, the method may further include, during execution of the first network stack component, detecting a device operating condition of a hardware component of the computing device. The method may further include modifying the performance variable goal state based at least in part on the device operating condition, as specified by the performance profile.

According to this aspect, the performance variable goal state may be a connections-per-second maximization goal state, a latency minimization goal state, a throughput maximization goal state, or a cycles-per-byte minimization goal state.

According to this aspect, each network stack component of the plurality of network stack components may be a Transmission Control Protocol/Internet Protocol (TCP/IP) process, a network address translation (NAT) process, a virtual machine switch, or a network interface controller (NIC) driver.

According to this aspect, each of the network performance parameter and the additional network performance parameter may respectively be one of a TCP window size, a virtual machine switch batch size, a NIC interrupt moderation setting, a NIC maximum transfer unit (MTU) size, a hyperthreading setting of the processor, or a power consumption setting of the computing device.

According to another aspect of the present disclosure, a server computing device is provided. The server computing device may include a processor configured to receive diagnostic data from a client-side network stack component included in a network stack and executed at a client computing device. The diagnostic data may indicate a value of a performance variable of the client-side network stack component. The processor may be further configured to receive, from the client computing device, a performance variable goal state for the client-side network stack component. The processor may be further configured to control a server-side network parameter of a server-side network stack component included in the network stack based at least in part on the performance variable goal state and the diagnostic data such that the performance variable of the client-side network stack component approaches the performance variable goal state as indicated by the diagnostic data.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing device comprising:
a processor configured to:
  generate a graphical user interface that indicates a plurality of performance profiles, wherein:
    the plurality of performance profiles is respectively associated with a plurality of different network activities performed by a plurality of different applications installed on the computing device;
    an individual performance profile of the plurality of performance profiles indicates a performance variable goal state for a first network stack component of a plurality of network stack components included in a network stack;
  determine a selected performance profile by receiving a user selection of a performance profile from the plurality of performance profiles;
  control a first network performance parameter of the first network stack component such that a value for a performance variable of the first network stack component approaches an associated performance variable goal state indicated by the selected performance profile; and
  transmit, to a second network stack component of the plurality of network stack components, instructions to control a second network performance parameter of the second network stack component such that the value for the performance variable of the first network stack component approaches the performance variable goal state.

2. The computing device of claim 1, wherein the instructions to control the second network performance parameter of the second network stack component are transmitted to another computing device.

3. The computing device of claim 1, wherein the processor is further configured to:
  transmit a respective plurality of goal state opt-in requests to a plurality of additional network stack components including the second network stack component;

receive a goal state opt-in response from the second network stack component; and transmit the instructions to control the second network performance parameter of the second network stack component subsequent to receiving the goal state opt-in response.

4. The computing device of claim 1, wherein the processor is further configured to:

generate diagnostic data for the first network stack component, the diagnostic data indicating the value for the performance variable of the first network stack component during execution of the first network stack component; and output the diagnostic data to the second network stack component.

5. The computing device of claim 1, further comprising a display device and a user input device, wherein the graphical user interface includes a performance profile interface element and the processor is further configured to:

output the GUI at the display device, wherein the user selection is received at the performance profile interface element via the user input device.

6. The computing device of claim 1, wherein the processor is further configured to execute the first network stack component, and, during the execution of the first network stack component:

detect a device operating condition of a hardware component of the computing device; and modify the associated performance variable goal state based at least in part on the device operating condition.

7. The computing device of claim 6, wherein the processor is further configured to transmit the instructions based at least in part on the device operating condition.

8. The computing device of claim 6, wherein the device operating condition includes at least one of:

an amount of available memory;

an amount of available electrical power; or a deferred procedure call (DPC) duration.

9. The computing device of claim 1, wherein the associated performance variable goal state is a connections-per-second maximization goal state, a latency minimization goal state, a throughput maximization goal state, or a cycles-per-byte minimization goal state.

10. The computing device of claim 1, wherein an individual network stack component of the plurality of network stack components is a Transmission Control Protocol/Internet Protocol (TCP/IP) process, a network address translation (NAT) process, a virtual machine switch, or a network interface controller (NIC) driver.

11. The computing device of claim 10, wherein each of the first network performance parameter and the second network performance parameter is respectively one of a TCP window size, a virtual machine switch batch size, a NIC interrupt moderation setting, a NIC maximum transfer unit (MTU) size, a hyperthreading setting of the processor, or a power consumption setting of the computing device.

12. A method for use with a computing device, the method comprising:

generating a graphical user interface that indicates a plurality of performance profiles, wherein:

the plurality of performance profiles is respectively associated with a plurality of different network activities performed by a plurality of different applications installed on the computing device;

an individual performance profile of the plurality of performance profiles indicates a performance variable goal state for a first network stack component of a plurality of network stack components included in a network stack;

determining a selected performance profile by receiving a user selection of a performance profile from the plurality of performance profiles;

controlling a first network performance parameter of the first network stack component such that a value for a performance variable of the first network stack component approaches an associated performance variable goal state indicated by the selected performance profile; and transmitting, to a second network stack component of the plurality of network stack components, instructions to control a second network performance parameter of the second network stack component such that the value for the performance variable of the first network stack component approaches the performance variable goal state.

13. The method of claim 12, further comprising:

transmitting a respective plurality of goal state opt-in requests to a plurality of additional network stack components including the second network stack component;

receiving a goal state opt-in response from the second network stack component; and transmitting the instructions to control the second network performance parameter of the second network stack component subsequent to receiving the goal state opt-in response.

14. The method of claim 12, further comprising:

generating diagnostic data for the first network stack component, the diagnostic data indicating the value for the performance variable of the first network stack component during execution of the first network stack component; and outputting the diagnostic data to the second network stack component.

15. The method of claim 12, further comprising, during execution of the first network stack component:

detecting a device operating condition of a hardware component of the computing device, and modifying the associated performance variable goal state based at least in part on the device operating condition.

16. The method of claim 12, wherein the associated performance variable goal state is a connections-per-second maximization goal state, a latency minimization goal state, a throughput maximization goal state, or a cycles-per-byte minimization goal state.

17. The method of claim 12, wherein an individual network stack component of the plurality of network stack components is a Transmission Control Protocol/Internet Protocol (TCP/IP) process, a network address translation (NAT) process, a virtual machine switch, or a network interface controller (NIC) driver.

18. The method of claim 12, wherein each of the first network performance parameter and the second network performance parameter is respectively one of a TCP window size, a virtual machine switch batch size, a NIC interrupt moderation setting, a NIC maximum transfer unit (MTU) size, a hyperthreading setting, or a power consumption setting.

19. A storage device storing instructions that, when executed by a processor, configure a computing device to:

generate a graphical user interface that indicates a plurality of performance profiles, wherein:

the plurality of performance profiles is respectively associated with a plurality of different network activities performed by a plurality of different applications installed on the computing device;

an individual performance profile of the plurality of performance profiles indicates a performance variable goal state for a first network stack component of a plurality of network stack components included in a network stack;

determine a selected performance profile by receiving a user selection of a performance profile from the plurality of performance profiles;

control a first network performance parameter of the first network stack component such that a value for a performance variable of the first network stack component approaches an associated performance variable goal state indicated by the selected performance profile; and transmit, to a second network stack component of the plurality of network stack components, instructions to control a second network performance parameter of the second network stack component such that the value for the performance variable of the first network stack component approaches the performance variable goal state.

20. The storage device of claim 19, wherein the processor is further configured to execute the first network stack component, and, during the execution of the first network stack component:

detect a device operating condition of a hardware component of the computing device; and modify the associated performance variable goal state based at least in part on the device operating condition.

* * * * *